United States Patent [19]

Eino et al.

[11] Patent Number: 5,153,721
[45] Date of Patent: Oct. 6, 1992

[54] METHOD AND APPARATUS FOR MEASURING AN OBJECT BY CORRELATING DISPLACED AND SIMULATED OBJECT IMAGES

[75] Inventors: Teruo Eino, Hachioji; Yutaka Konomura, Tachikawa, both of Japan

[73] Assignee: Olympus Optical Co., Ltd., Tokyo, Japan

[21] Appl. No.: 709,735

[22] Filed: Jun. 3, 1991

[30] Foreign Application Priority Data

| Jun. 4, 1990 [JP] | Japan | 2-146881 |
| Jul. 23, 1990 [JP] | Japan | 2-196726 |
| Apr. 10, 1991 [JP] | Japan | 3-77966 |

[51] Int. Cl.⁵ .............................. H04N 7/18
[52] U.S. Cl. ..................... 358/107; 358/98; 358/903; 382/28
[58] Field of Search .......... 358/107, 89, 903, 98, 358/160, 88, 100; 382/28

[56] References Cited

U.S. PATENT DOCUMENTS

| 4,935,810 | 6/1990 | Nonami et al. | 358/107 X |
| 4,935,879 | 6/1990 | Ueda | 382/28 X |
| 4,980,763 | 12/1990 | Lia | 358/107 X |
| 5,005,117 | 4/1991 | Ikumi | 358/107 X |
| 5,020,114 | 5/1991 | Fujioka et al. | 382/28 X |
| 5,029,225 | 7/1991 | Ueda | 382/28 |
| 5,047,848 | 9/1991 | Krauter | 358/107 X |

Primary Examiner—Victor R. Kostak
Attorney, Agent, or Firm—Armstrong & Kubovcik

[57] ABSTRACT

The length, area or the like of a portion of an object is measured for examination through the processes of first, displaying an image of the object on a monitor; second, after producing a simulating graphic form corresponding to the object, specifying certain positions of the object image on the monitor to which a plurality of positions of the simulating graphic form should correspond; third, varying the attitude of the simulating graphic form on the basis of data on the specified positions in such a manner that the simulating graphic form becomes substantially coincident with the object image; and fourth, causing a plurality of points forming the particular examination portion of the object to have their position on the object image specified so that, on the basis of data on the position of these points, corresponding points on the simulating graphic form are determined.

17 Claims, 27 Drawing Sheets

FIG. 34
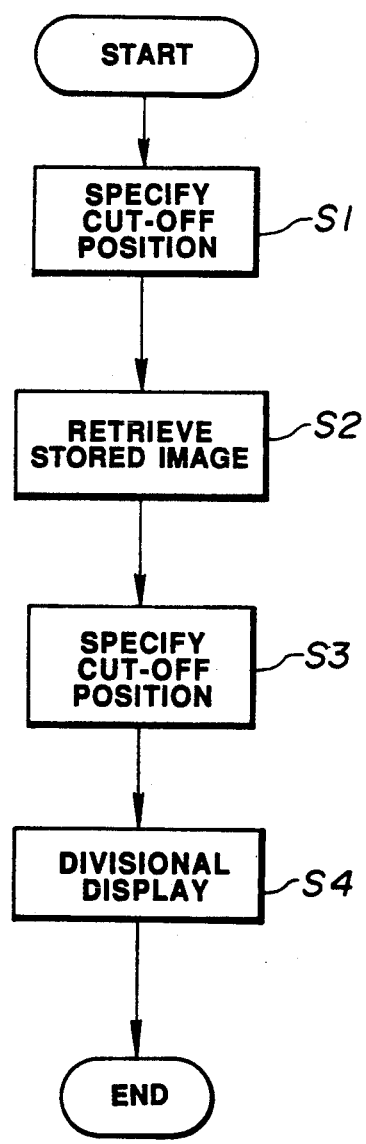
FIG. 35
(a)
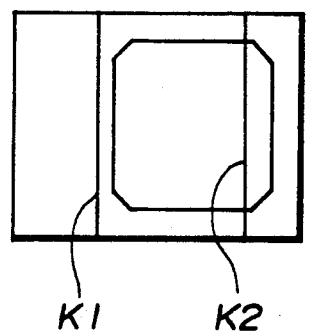
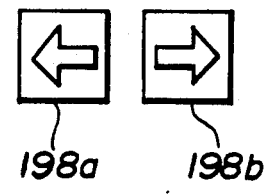
(b)
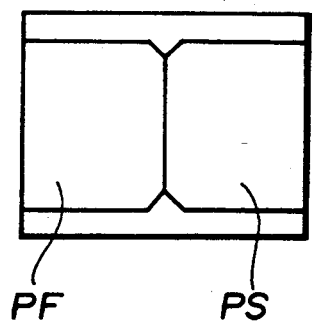

METHOD AND APPARATUS FOR MEASURING AN OBJECT BY CORRELATING DISPLACED AND SIMULATED OBJECT IMAGES

BACKGROUND OF THE INVENTION

1. Field of the Invention

The present invention relates to a method of measuring an object by employing an imaging means that is adapted to measure a length and the like of the object by utilizing data on the overall shape and dimension of the object. The present invention also relates to an apparatus for the method.

2. Related Art Statement

An apparatus for measuring a dimension of an object (i.e., the object whose image is obtained for observation) by employing an endoscope is disclosed in Japanese Patent Laid-Open (kokai) No. 59-70903. In the disclosed art, in order to measure a length of an object, the apparatus must include a laser beam generating means for projecting a reference length, necessary to the length measurement, onto the object, as well as a light guide for guiding the laser beam through the endoscope, and a lens for projecting the beam. In addition, the art has a drawback in that the structure of the endoscope is complicated, requiring its front end portion to have a large diameter, and precluding the front end from being inserted into a hole with a small diameter. Also, the art involves a certain limitation of the measurement condition; a length cannot precisely be measured if the portion onto which the laser beam is projected is not a planar surface perpendicular to the laser beam.

In view of these disadvantages, the present inventor has proposed, in U.S. Pat. No. 4,989,083, a method of measuring the length or the like of a particular portion of an object which is to be examined. In the method, an imaging means such as an electronic endoscope or a small TV camera is employed to obtain an image of an object whose overall shape and dimension are already known. On the other hand, a perspective of the object is drawn by computer graphics on the basis of data on the known shape and dimension of the object. Certain parameters for drawing the perspective are varied with a view to making the perspective coincident with the image of the object, and thus to allowing for the measurement of the length, etc.

The proposed method (hereinafter referred to as "the previous proposal") requires the process of making the image of the object and the perspective of the object coincident with each other by, for instance, superimposing them. This matching (e.g., superimposing) process is executed by varying, on three-dimensional coordinates, six parameters, namely, positions x, y and z and directions $\theta x$, $\theta y$, and $\theta z$ of the graphic form of the object, such as those shown in FIGS. 23 and 24. In the previous proposal, these parameters are varied through the operator's operation on the keyboard so as to superimpose the image of the object and the corresponding graphic form on each other. However, since this operation is very complicated, such a superimposing operation cannot easily be performed even by a very skilled operator.

OBJECT AND SUMMARY OF THE INVENTION

An object of the present invention is to provide a method of and an apparatus for measuring an object by employing an imaging means, the method and the apparatus enabling, in order to measure the length, area, etc. of a particular measurement portion of the object, an image of the object and a graphic form simulating the object to become coincident with each other without requiring complicated operation.

Another object of the present invention is to provide a method of and an apparatus for measuring an object by employing an imaging means, the method and the apparatus enabling the attitude of a graphic form simulating the object to be automatically determined in such a manner that the graphic form represents a substantially identical aspect of the object with that reproduced as an image of the object only by specifying certain positions of the image to which particular positions of the graphic form should correspond.

Still another object of the present invention is to provide a method of and an apparatus for measuring an object by employing an imaging means, the method and the apparatus enabling the area of a particular portion of an object to be measured by specifying, on an image of the object, a plurality of points in the periphery of the particular portion.

A further object of the present invention is to provide a method of and an apparatus for measuring an object by employing an imaging means, the method and the apparatus enabling an image of the object and a graphic form produced in correspondence with the object to become coincident with each other even when the object is only partially visible on the screen of the monitor.

According to the present invention, there is provided a method of measuring an object by employing an imaging means, comprising: an image displaying process wherein an image of an object whose overall shape and dimension are already known is obtained by means of an imaging means, and the image of the object is displayed, as an object image, on the screen of a monitor; a position specifying process wherein, after a simulating graphic form corresponding to the object is produced on three-dimensional coordinates on the basis of data on the known shape and dimension of the object, certain positions of the object image on the monitor to which a plurality of particular positions of the simulating graphic form should correspond, are specified; a graphic form attitude varying process wherein the attitude of the simulating graphic form is varied on the basis of data on those positions of the object image specified in the position specifying process in such a manner that the simulating graphic form produced on the basis of the data on the known shape and dimension of the object becomes substantially coincident with the object image on the monitor; a position determining process wherein a plurality of points forming a particular measurement portion of the object have their position on the object image on the monitor specified so that, on the basis of data on the specified position of the plurality of points, the position of a plurality of corresponding points of the simulating graphic form is determined; and a measuring process wherein, on the basis of data on the position on the simulating graphic form corresponding to the position of the plurality of points specified in the position determining process, a quantity which is the subject of measurement and which is defined by the plurality of points is measured.

According to the present invention, there is provided an apparatus for measuring an object by employing an imaging means, the apparatus being adapted to measure an object whose overall shape and dimension are already known, the apparatus comprising: a monitor for displaying, on its screen, an image of an object obtained by an imaging means; simulating graphic form producing means for producing, on the basis of data on the known shape and dimension of the object, a simulating graphic form corresponding to the object; position specifying means for specifying certain positions of the image of the object to which a plurality of particular positions of the simulating graphic form should correspond; and calculating means for causing the attitude of the simulating graphic form to be varied on the basis of those positions of the image specified by the position specifying means in such a manner that the simulating graphic form becomes substantially coincident with the image of the object, for causing, after the attitude of the simulating graphic form has been determined, a plurality of points forming a particular examination portion of the object to have their position on the image of the object specified, for causing, on the basis of data on the position of the plurality of points, the position of a plurality of corresponding points of the simulating graphic form to b determined, and for causing a quantity which is to be measured and which is defined by the plurality of points to be calculated.

The above and other features and advantages of the present invention will be apparent from the following description.

BRIEF DESCRIPTION OF THE DRAWINGS

FIGS. 1 through 15 illustrate a first embodiment of the present invention, in which FIG. 1 is a diagram showing the construction of an endoscope system used to carry out a method according to the first embodiment;

FIG. 2 is a perspective view of a jet engine shown together with its rotor;

FIG. 3 is a perspective view of a blade serving as an object to be examined which is within the jet engine;

FIG. 4 is a diagram showing a simulating graphic form of a blade that is produced on the basis of data on the known shape and the dimension of the blade;

FIG. 5 is a view for explaining how a certain position is specified on a monitor screen displaying an image of the blade;

FIG. 6 a view for explaining how another position is specified on the monitor screen displaying;

FIG. 7 is a view for explaining how the specifying of the two positions shown in FIGS. 5 and 6 results in two straight lines being determined;

FIG. 8 is a view for explaining how one of the two specified positions, each on one of the two straight lines, has its position determined in relation with the position of the other if the spatial distance between these positions is already known;

FIG. 9 is a view for explaining how a further position is specified;

FIG. 10 is a view for explaining how a still further position is specified;

FIG. 11 is a view for explaining how the specifying of the positions shown in FIGS. 9 and 10 results in two more straight lines being determined;

FIG. 12 is a view for explaining the fact that, after two points on an object have been determined, there is a certain degree of freedom in the rotational position (rotational angle) about the line passing through the two points;

FIG. 13 is a view for explaining how, after two points on the monitor screen displaying the blade image are specified, the calculated length of the segment between these points is displayed;

FIG. 14 is a view for explaining how the specifying of the two points shown in FIG. 13 results in two points on the blade-simulating graphic form being determined; and FIG. 15 is a flow chart.

FIGS. 17 through 22 illustrate a second embodiment of an object measuring method according to the present invention, in which FIG. 17 is a view for explaining how a certain position is specified on a monitor screen displaying an image of a blade (object);

FIG. 18 is a view for explaining how another position is specified;

FIG. 19 is a view showing straight lines determined by the specifying of positions including those shown in FIGS. 17 and 18;

FIG. 20 is a view for explaining how a specific straight line is determined on three-dimensional coordinates when a specific position and the angle formed at the position between two lines are given;

FIG. 21 is a view for explaining, after two points on an object have been specified, there is a certain degree of freedom in the rotational angle about a straight line passing through the two points; and FIG. 22 is a view for explaining an image of the object and a graphic form specified from among those shown in FIG. 21, both of the image and the graphic form being displayed on the monitor screen.

FIGS. 25 through 36 illustrate an image filing apparatus serving as an example to which a method of and an apparatus for measuring an object are applied, in which FIG. 25 is a perspective view of an image filing apparatus having a central control unit (CCU) removably mounted therein;

FIG. 26 is a view showing the entire construction of an endoscope system having the image filing apparatus;

FIG. 27 is an exploded perspective view of a hard disk (HD) fixing mechanism;

FIG. 28 is a fragmentary sectional view of the fixing mechanism shown in FIG. 27;

FIG. 29 is a block diagram showing the internal arrangement of the image filing apparatus;

FIG. 30 is a block diagram showing the arrangement of a superimposing circuit;

FIG. 31 is a block diagram showing the arrangement of a mouse circuit;

FIG. 32 is a block diagram showing the arrangement of software;

FIG. 33 is a view showing an example of a display on a monitor screen;

FIG. 34 is a flowchart showing the operation performed when the function COMPARE is selected;

FIGS. 35A and 35B are views for explaining the operation shown in FIG. 34; and

FIG. 36 is a view showing a system setting menu.

DETAILED DESCRIPTION OF THE PREFERRED EMBODIMENTS

FIGS. 1 through 15 illustrate a first embodiment of the present invention.

Figure 1:
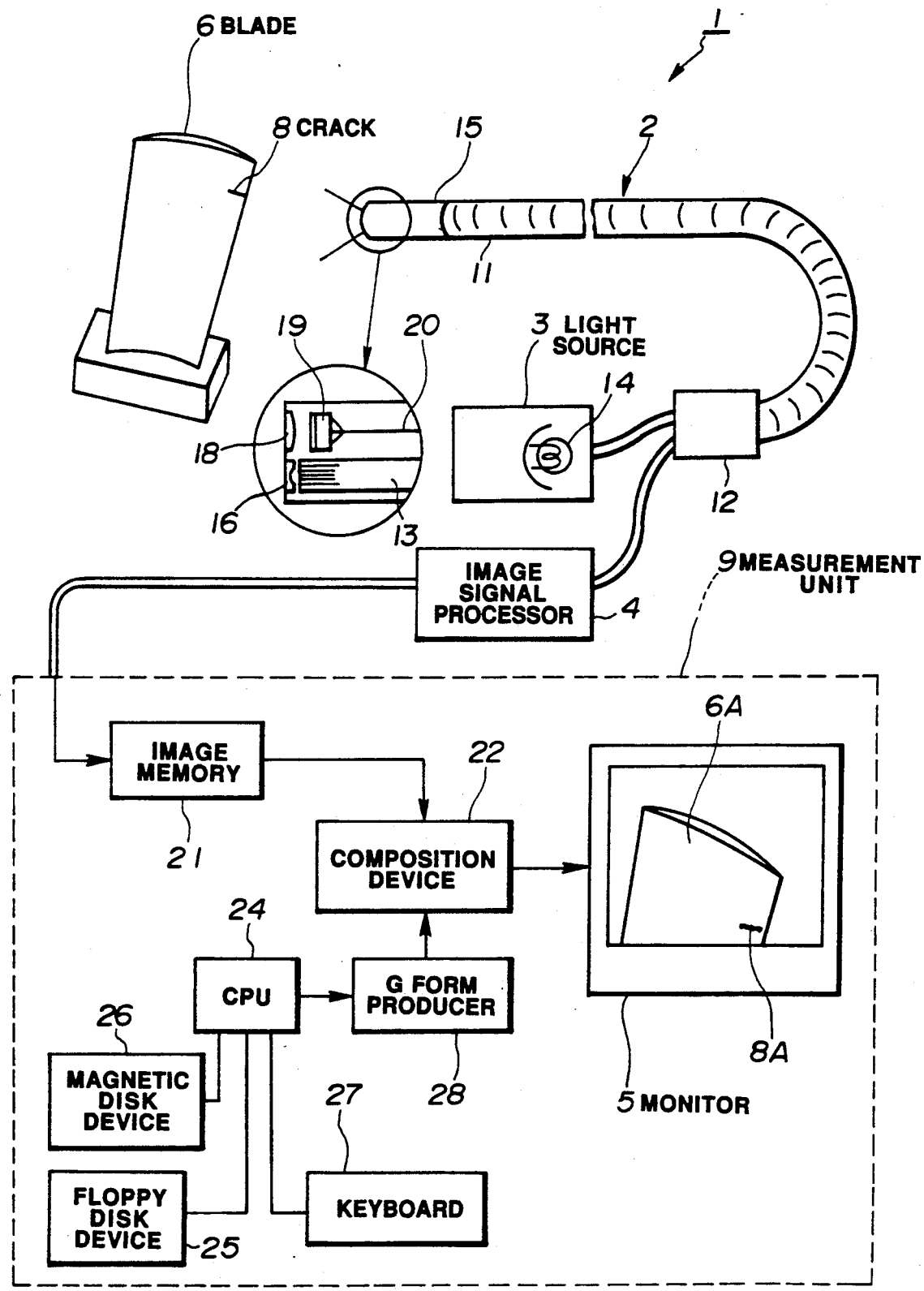

As shown in FIG. 1, an endoscope system 1 embodying the present invention includes an electronic endoscope 2, a light source 3 for supplying illumination light to the electronic endoscope 2, a screen-image signal processor 4 for processing a signal from or to an imaging means of the electronic endoscope 2, and a measurement unit 9 for measuring a quantity to be measured (such as a length or area) of a particular portion to be examined (such as a crack 8) of an object (such as a blade 6) by performing such processes as displaying a typical screen-image signal generated by the screen-image signal processor 4 on a monitor 5, and displaying a graphic form (hereinafter abbreviated to "G form" unless otherwise specified) simulating the object such as the blade 6.

The electronic endoscope 2 includes an elongated inserting section 11, and a large-diameter operating section 12 at the rear end of the inserting section 11.

A light guide 13 is passed through the inside of the inserting section 11. The rear end of the light guide 13 is connected with the light source 3 so that illumination light from a lamp 14 of the light source 3 is transmitted through the light guide 13, and projected from the front end 15 through an illumination lens 16 toward the object, i.e., the subject of observation, whose image is to be obtained.

An image of the illuminated object is focused by an objective 18 disposed at the front end 15 onto the image-focusing surface of a CCD 19 disposed at the focal plane of the objective 18. A mosaic color filter is mounted on the image-focusing surface of the CCD 19 so as to perform color separation with respect to each of picture elements.

A signal resulting from photoelectric conversion by the CCD 19 is inputted via a signal line 20 to the screen-image signal processor 4. After the signal is processed by the processor 4, the processed signal is inputted to an image memory 21 of the measurement unit 9, and temporarily stored therein. When a screen-image signal is read from the image memory 21, the signal can be outputted via a composition device 22 to the monitor 5 so that an image 6A of the object (the blade 6 in this embodiment) is displayed on the screen of the monitor 5.

The measurement unit 9 comprises, in addition to the image memory 21 and the composition device 22, the following: a CPU 24 for executing a measurement program for measuring the size (length or the like) of a particular portion (e.g., the crack 8) of the object; a floppy disk (FD) device 25 for reading data defining the overall shape and dimension of the object from a floppy disk on which such data is recorded, and for outputting the read data to the CPU 24; a magnetic disk device 26 used to, for example, record a program, etc. to be executed by the measurement unit 9; a keyboard 27 used to, for example, input data, etc.; and a graphic form producer 28 for producing, under the control of the CPU 24, a graphic form simulating the object 6, a cursor, etc.

The composition device 22 is capable of both: allowing only one of the screen-image signal (also referred to as "object image signal" or "image signal" in the Specification) outputted from the image memory 21 and the object-simulating G form (signal) produced by the G form producer 28 under the control of the CPU 24 to be outputted to the monitor 5; and allowing both of the object image and the G form to be outputted to the monitor 5 while they are superimposed on each other. When a cursor is moved on the monitor screen by the operator's operation on the keyboard 27, the position of the cursor is monitored by the CPU 24.

Figure 2:
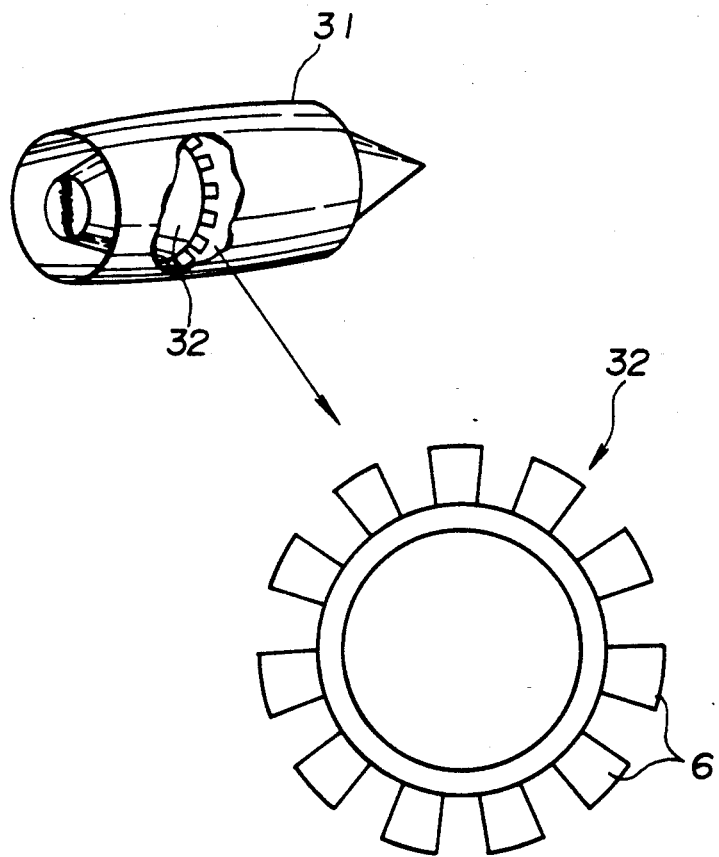

A method of measuring an object by using the system 1 will be described concerning, for example, the case where the inside of a jet engine 31 of an aircraft, shown in FIG. 2, is examined.

The jet engine 31 includes, in the inside thereof, a turbine, a compressor, and a plurality of rotors 32 associated with these devices. Each rotor 32 has a plurality of blades 6 radially arranged, and is rotatable about the axis of rotation through the center thereof. A blade 6 may be such as that shown in FIG. 3.

Figure 3:
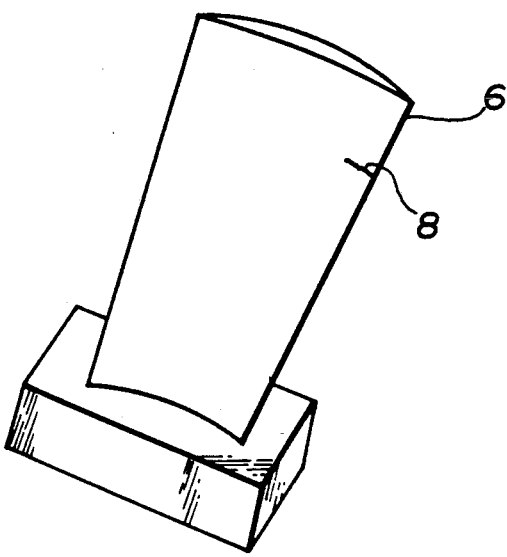

As shown in FIG. 3, a blade 6 may suffer from the formation of a crack 8 due, for instance, to fatigue after a long flight time or collision with foreign matter.

If the crack is shorter than a certain standard length, the engine may be used continuously without the risk of a trouble. However, if the crack is longer than the standard length, the continuous use of the engine involves the risk of the breakage of the blade 6, hence, the risk of a serious trouble with the entire engine. In order to prevent such risks, an aircraft ought to be inspected periodically, that is, each time a certain flight time passes. The checking of blades as to crack formation is a particularly important part of the periodical inspection. In the checking, the length of any crack formed in a blade must be measured, and compared with a length prescribed in the inspection standards, as described above.

When a front end portion of the electronic endoscope 2 is inserted into the inside of the engine 31 through an examination hole of the engine 31, it is possible to obtain an image of the blade 6 while the blade 6 is included in the field of view (as shown in the upper part of FIG. 1).

When an image of the blade 6 has thus been obtained, the image is stored in the image memory 21. Thereafter, writing into the memory 21 is prohibited, and the image is displayed via the composition device 22 to the monitor 5 (as shown in the lower part of FIG. 1). The image may be displayed as either a frozen image or a live image.

On the other hand, data defining the overall shape and dimension of the blade 6 is supplied from CAD equipment (not shown), and is inputted to the measurement unit 9 by, for example, the floppy disk device 25. Such data may be used after it is copied from the floppy disk device 25 to the magnetic disk device 26.

Figure 4:
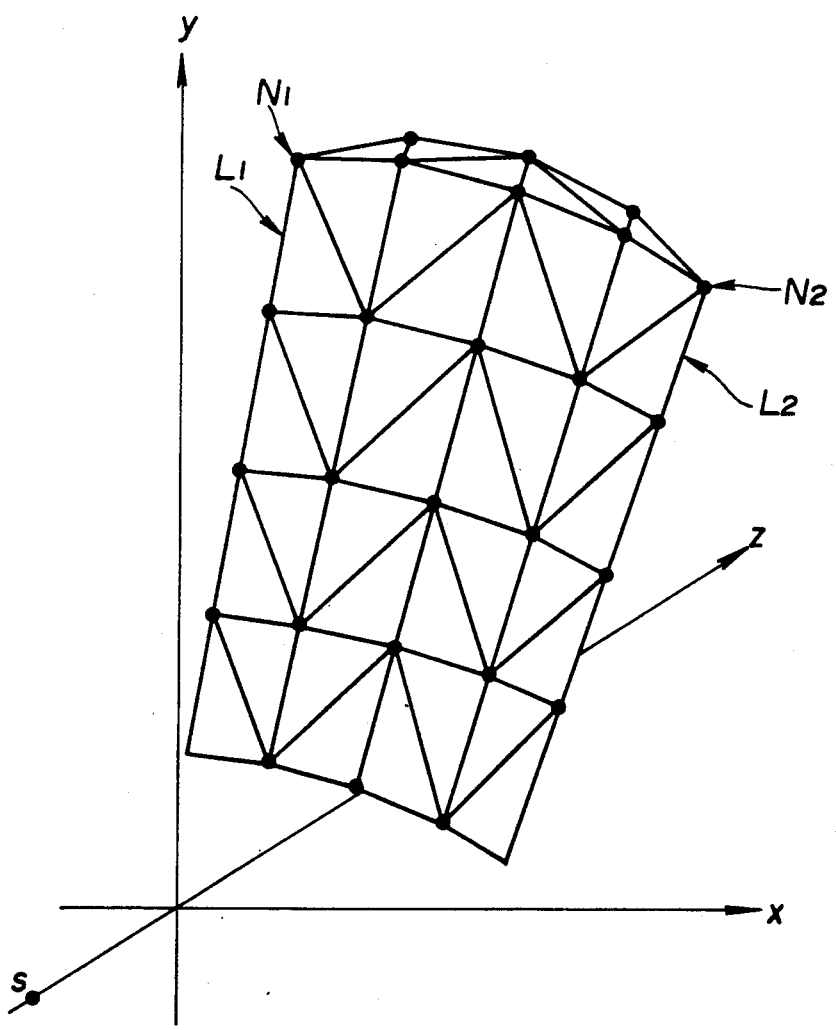

On the basis of the shape and dimension data, the CPU 24 causes the G form producer 28 to produce a graphic form simulating the blade 6 on three-dimensional coordinates comprising x, y and z axes, such as the G form shown in FIG. 4. The produced G form is converted into a visible image by the G form producer 28, and displayed via the composition device 22 on the monitor 5. In order to display such a G form, the displaying by the monitor 5 may be temporarily switched from the displaying of the object image 6A to that of the G form. Alternatively, the G form may be displayed by superimposing it on the object image 6A by, for example, drawing the G form with lines in different color(s). Still alternatively, the G form may be displayed in a second window on the monitor screen.

In an object measuring method according to this embodiment (and also in previous proposal described before in the Related Art Statement), it is necessary that the position and the orientation of the G form on the xyz three-dimensional coordinates be varied in such a manner that, when the G form is viewed from the station point S on the Z axis, the G form is substantially identical with the image 6A displayed on the monitor 5 (as shown in FIG. 1).

In this embodiment, the operator specifies certain positions of the object image to which particular positions of the G form (e.g., that shown in FIG. 4) should correspond. This specification process will be described with reference to FIG. 4, etc.

Figure 5:
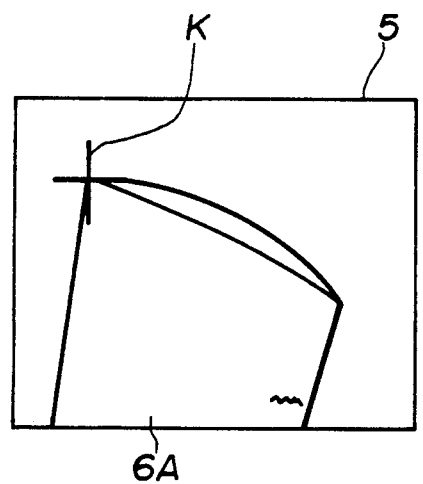

First, a node N1 of the G form is used. Specifically, a certain position of the object image 6A (shown in FIG. 1) to which the node N1 (shown in FIG. 4) should correspond is specified by suitably moving a cursor K, as shown in FIG. 5. Such a cursor K is produced as a video signal by the G form producer 28 (shown in FIG. 1), superimposed on the image 6A by the composition device 22, and displayed on the monitor 5. The position of the cursor K on the image 6A displayed on the monitor 5 is controlled by the CPU 24 on the basis of the operator's operation on the keyboard 27. Accordingly, the CPU 24 always monitors the position of the cursor K.

Figure 6:
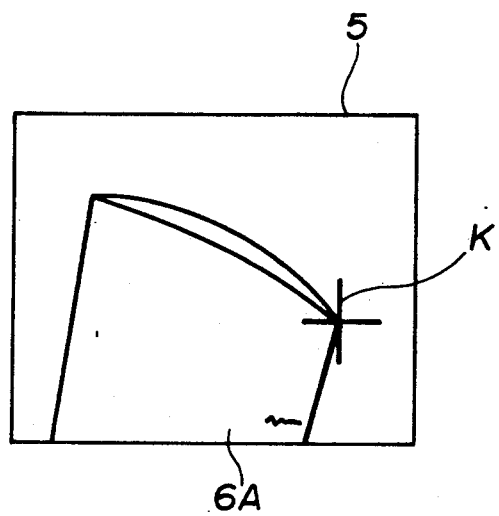

Subsequently, a certain position of the object image (shown in FIG. 1) to which another node N2 of the G form (shown in FIG. 4) should correspond is specified in a similar manner, as shown in FIG. 6.

Figure 7:
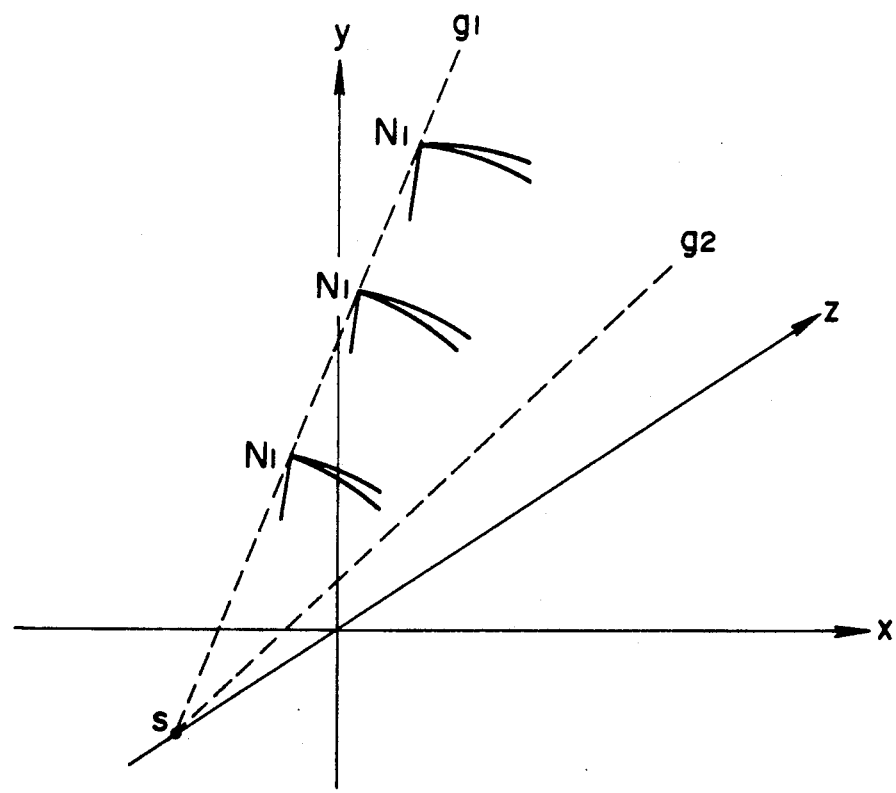

Thus, when the positions to which the nodes N1 and N2 should respectively correspond are specified on the monitor screen displaying the object image 6A, this means that, on the xyz three-dimensional coordinates, two straight lines g1 and g2 passing through the station point S are determined, as shown in FIG. 7. The node N1 is positioned somewhere on the straight line g1, and the node N2 on the straight line g2.

Figure 8:
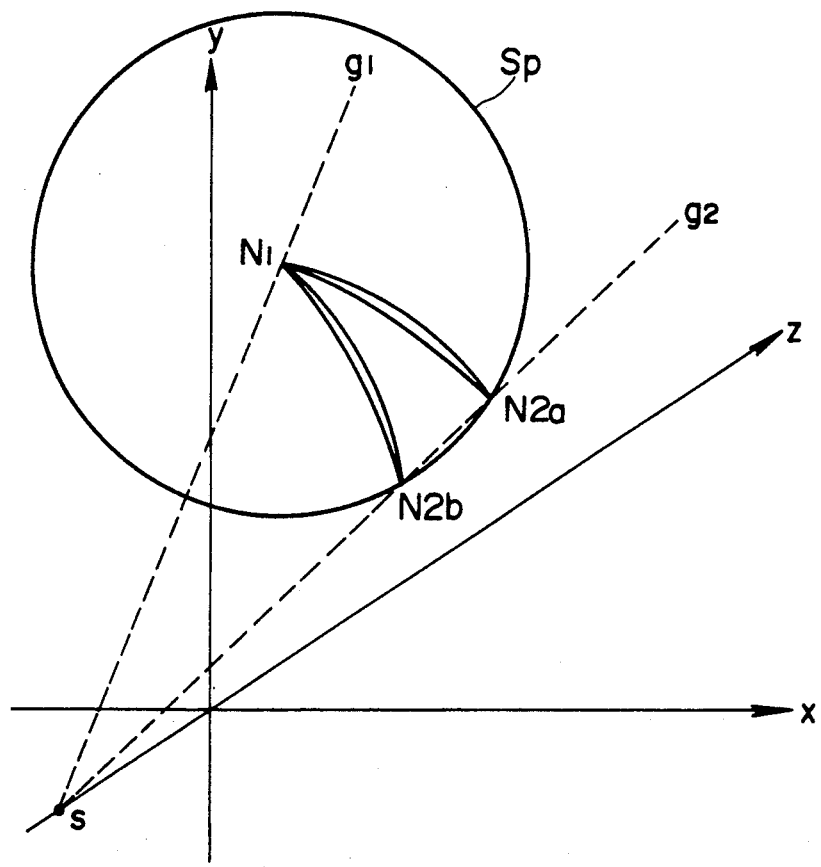

Since the nodes N1 and N2 of the G form simulating the blade 6 are the counterparts of the actual nodes N1' and N2' on the blade 6 whose shape and dimension are already determined, the spatial distance N1N2 between these nodes N1 and N2 is given. Therefore, if, as shown in FIG. 8, the node N1 is located at a certain position on the straight line g1, the other node N2 must be located at one of the intersections (points) of the straight line g2 and a sphere Sp having a center at the node N1 and a radius equal to the distance N1N2. In general, the number of the intersections of a sphere and a straight line is two at its maximum. Accordingly, if the node N1 is assumed to be located at the position shown in FIG. 8, the other node N2 should be located at one of the positions N2a and N2b also shown in FIG. 8.

In brief, when those positions on the screen to which the two nodes N1 ad N2 should correspond are specified, the two straight lines g1 and g2 are determined on the three-dimensional coordinates. If the node N1 is assumed to be at a certain position on the straight line g1, the other node N2 should be at one of the two definite points on the straight line g2.

Figure 9:
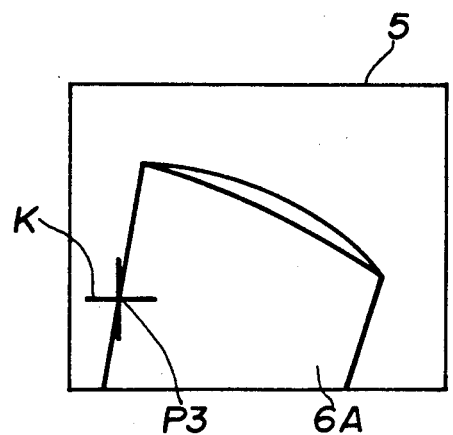

Subsequently, the operator specifies a certain position of the image 6A on the monitor screen to which a particular position on a straight line L1 (shown in FIG. 4) of the blade-simulating G form should correspond. For this purpose, because the position of the object image 6A which is to be occupied by the node N1 is already specified on the screen, all the operator has to do is, as shown in FIG. 9, to specify the position to be occupied by a point P3 which is on the line L1 but which is not the node N1.

Figure 10:
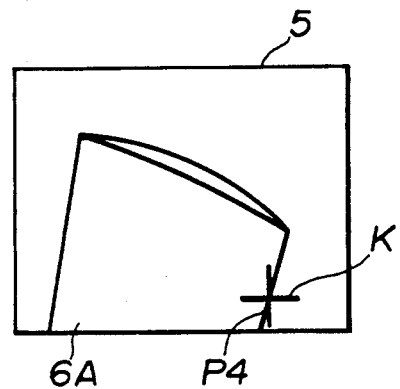

Similarly, in order to determine the position of another straight line L2 (shown in FIG. 4) of the G form, the operator specifies, as shown in FIG. 10, the position to be occupied by another point P4 which is on the straight line L2 but which is not the node N2.

Figure 11:
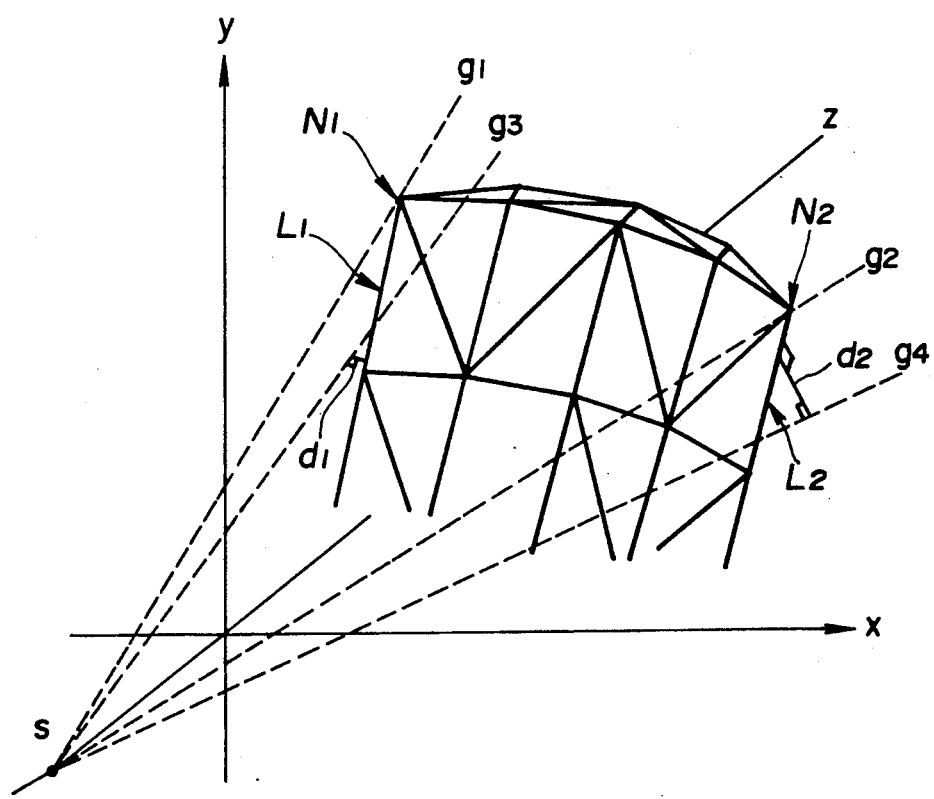

Thus, when the positions to which the points P3 and P4 should respectively correspond are specified, this means that, on the xyz three-dimensional coordinates, straight lines g3 and g4 passing through the station point S are determined, as shown in FIG. 11.

So far, as shown in FIGS. 5, 6, 9 and 10, the operator has specified certain positions on the monitor screen to which the four points N1, N2, P3 and P4 should respectively correspond.

Thereafter, a process of varying the attitude of the blade-simulating G form is automatically performed by the CPU 24.

Figure 12:
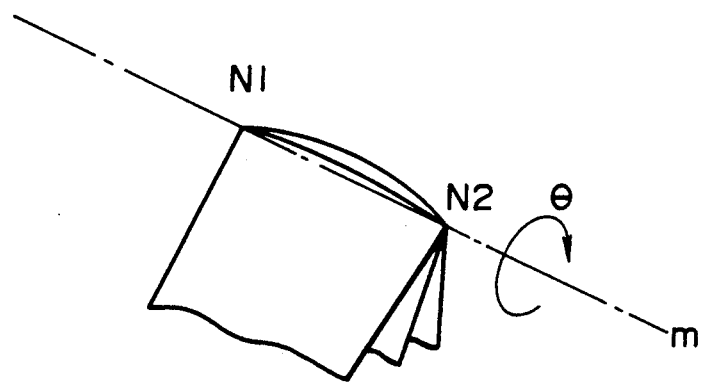

In FIG. 8, if the node N1 is located at a certain position on the straight line g1, the position of the other node N2 is at either the intersection N2a or the intersection N2b. It is assumed here that the node N2 is located at the intersection N2a. Thus, when the respective positions of the nodes N1 and N2 are fixed, though hypothetically, the remaining degree of freedom of the G form simulating the blade 6 consists only of the magnitude of the rotational (angle) position $\theta$ of the G form about the straight line m passing through the two nodes N1 and N2, as shown in FIG. 12. The rotational position $\theta$ must be correctly determined in order that the G form should correctly simulate the attitude of the blade 6.

Accordingly, it is assumed that the rotational position $\theta$ has a certain value, thereby rendering a provisional attitude of the G form simulating the blade 6 definite. Thus, a provisional G is obtained, as shown in FIG. 11.

In FIG. 11, the minimum spatial distance between the straight line g3 and the straight line L1 is expressed as d1. If the distance d1 = 0, these straight lines g3 and L1 cross each other. In general, however, d1≠0, and these straight lines g3 and L1 do not cross each other.

Similarly, the minimum spatial distance between the straight lines g4 and L2 is expressed as d2. In general, this distance d2 is not equal to 0, either.

The sum D of the respective squares of the two distances d1 and d2 is expressed as $D = D1^2 + d2^2$.

If the respective positions of the nodes N1 and N2 of the G form on the straight lines g1 and g2 are respectively the same as the actual positions of the nodes N1' and N2' of the blade 6 and, simultaneously, the rotational position $\theta$ (shown in FIG. 12) is the same as the actual rotational position, the blade-simulating G form on the xyz three-dimensional coordinates shown in FIG. 11 has exactly the same shape and position as the image 6A of the actual blade 6, displayed on the monitor, when the G form is viewed from the station point S.

If the blade-simulating G form is in this condition, the straight lines g3 and g4 cross the straight lines L1 and L2, respectively.

In the above-described condition, the distances d1 and d2 respectively satisfy the equations of d1 = 0 and d2 = 0, thereby rendering the sum D of the squares equal to 0 (D = 0). If the attitude of the G form is varied from the attitude satisfying these relations, the square sum D assumes a value greater than 0 (D > 0).

Based on this principle, the location of the node N1 on the straight line g1 is varied to various positions, and, position $\theta$ is varied to various values. With respect to each of these combinations, the sum D of the squares is calculated.

Specifically, the location of the node N1 and the value of the rotational position $\theta$ are each varied by a practical pitch, as shown in Table 1 below (where various N1 positions and various $\theta$ positions are respectively expressed as N1j and $\theta i$), and the sum D of the squares is calculated with respect to each of the combinations (in Table 1, square sums are expressed as Dji). Among all the combinations listed in Table 1, the combination of a certain Ni position and a certain rotational position $\theta$ that results in the minimum sum Dji of the squares permits the blade-simulating G form to have the attitude closest to that of the actual blade 6. [Table 8]

TABLE 1

| N1 | $\theta$ | | | | |
|----|----------|-----|---|------------|---|
|    | $\theta 0$ | $\theta 1$ | — | $\theta i$ | — |
| N10 | D00 | D10 | | | |
| N11 | D10 | D11 | | | |
| N1j |     |     | | Dji | |

Thus, the CPU 24 calculates the square sums Dji shown in Table 1, and obtains the Ni position and the rotational position $\theta$ that result in the minimum sum D of the squares. This enables the attitude of the blade-simulating G form to be very excellently and automatically matched to that of the actual blade 6. The operator need only to specify those positions on the screen to be occupied by the four points N1, N2, P3 and P4, as described before.

As described before, because there are two possible positions of the node N2 for one position of the node N1, in actual calculation, square sums Dji twice as many as those shown in Table 1 are calculated, and the minimum square sum is selected from among the calculated sums.

Figure 15:
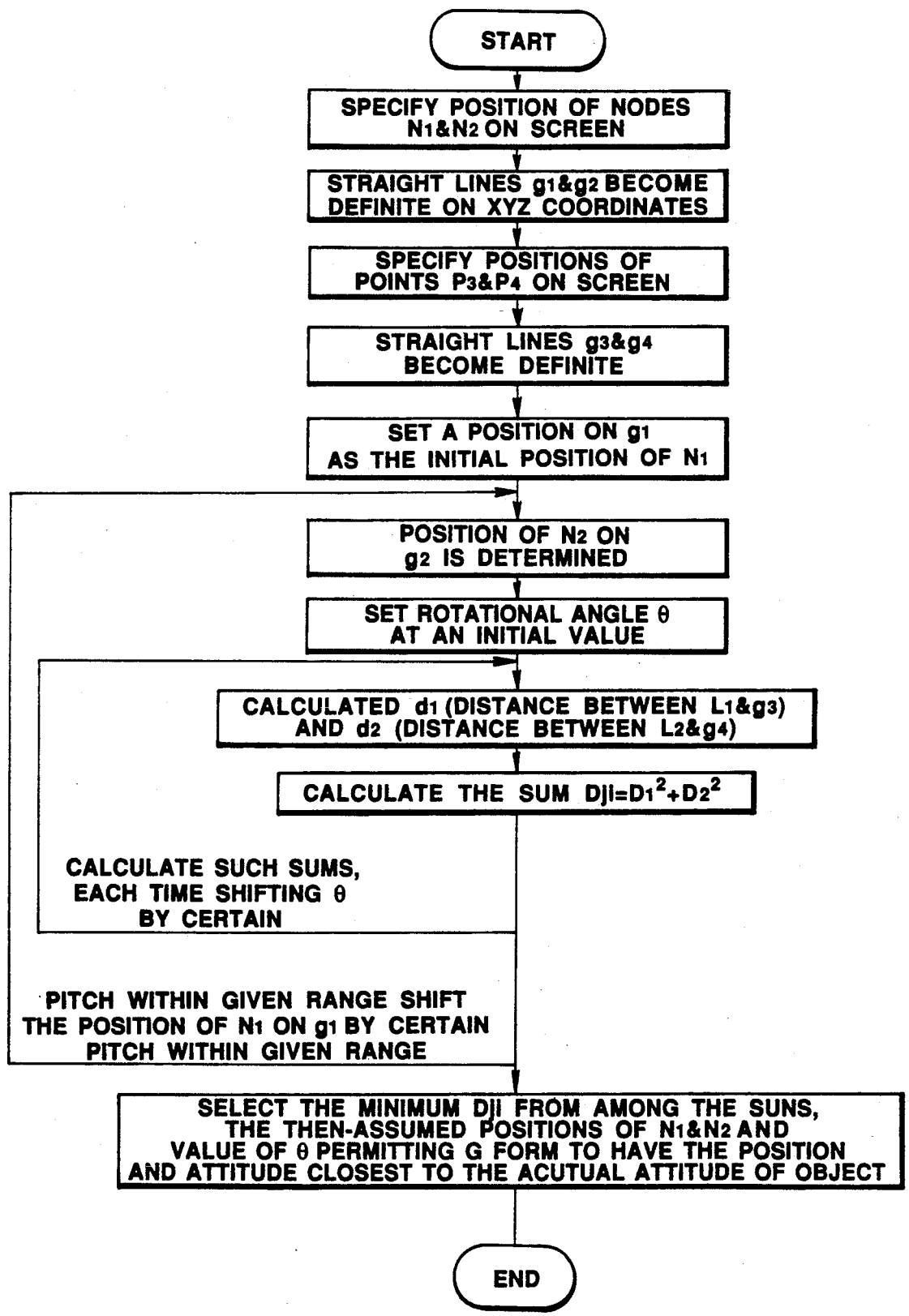

The above-described steps are summarized in the flowchart shown in FIG. 15.

Thus, when the G form simulating the blade 6 is made coincident in attitude with the actual blade 6, it becomes easy to measure the length of a crack image 8A (shown in FIG. 13) included in the object image 6A.

Specifically, the operator specifies the position of two points P5 and P6 (shown in FIG. 13) at either end of the crack image 8A in the object image 6A by suitably moving a cursor.

Figure 14:
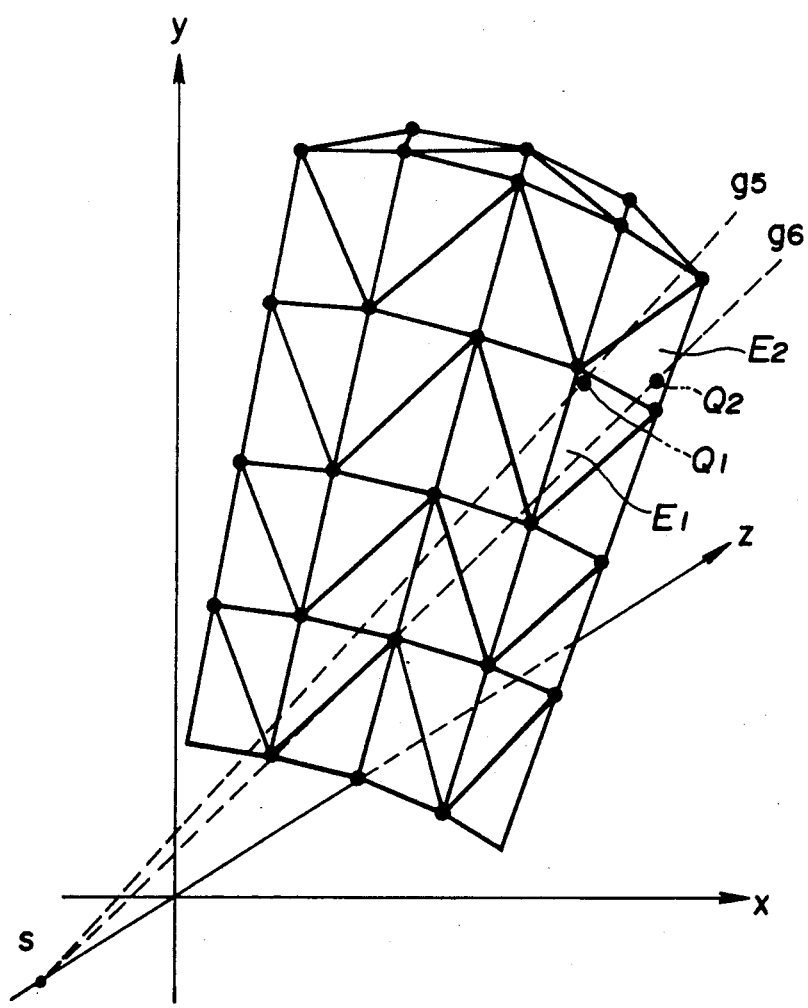

When the position of the points P5 and P6 are specified on the screen, this means that, as shown in FIG. 14, two straight lines g5 and g6 passing through the station point S are determined on the xyz three-dimensional coordinates. When these straight lines g5 and g6 are determined, the CPU 24 calculates the intersections (points) of these lines g5 and g6 and the blade-simulating G form in a three-dimensional space.

In FIG. 14, the straight line g5 crosses a triangular element E1 forming a part of the G form at an intersection (point) Q1. The straight line g6 crosses another element E2 at another intersection (point) Q2.

Figure 13:
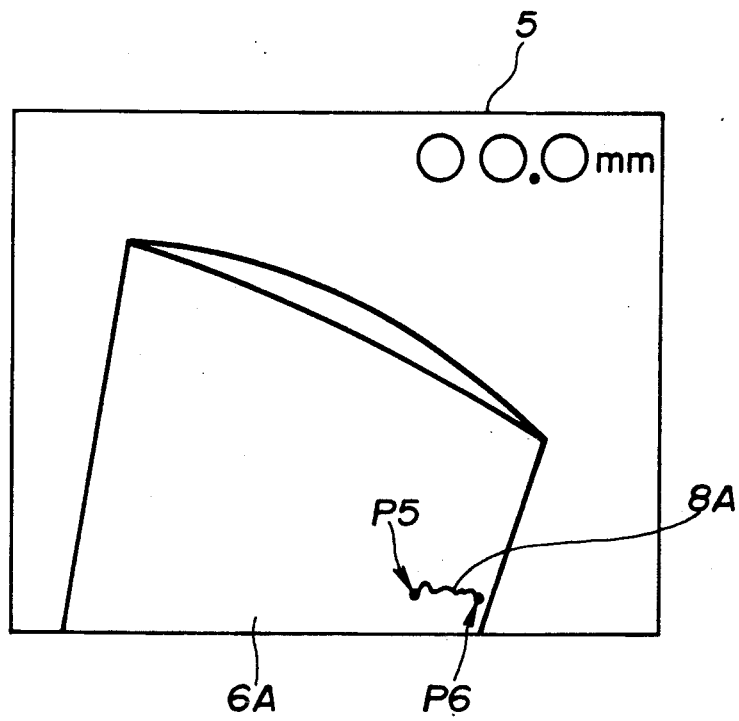

These intersections Q1 and Q2 correspond to the two ends of the crack 8 of the blade 6. The coordinates (xyz) of each of the intersections Q1 and Q2 can, of course, be calculated by the CPU 24, and so can be calculated the length Q1Q2 of the crack 8. The result of the calculation is displayed at, for instance, a corner of the monitor screen, as shown in FIG. 13.

According to this first embodiment, the operator has only to specify, on the monitor screen, certain positions of the image 6A of the blade 6 to which particular positions of the G form simulating the blade 6 should correspond; the remaining necessary operations are performed by CPU 24, etc. so as to automatically determine a certain G form having an attitude with which the G form is substantially identical with the object image 6A. Thus, the operator need not perform any complicated operations to make the blade image 6A and the blade-simulating G form coincident with each other, and can easily measure the length of the crack 8, etc.

Another advantage of the first embodiment is that the length or the like can be measured with a high level of precision even when the portion to be examined is not planar.

In the previous proposal by the present inventor, it is necessary that a perspective (referred to as, in the proposal, "a computer graphic image" abbreviated to "CG image") which is drawn by the use of data on the shape and dimension of the object should be displayed on the monitor. This is because the operator performs the operation of varying the attitude of the CG image to make it coincident with the object image while comparing the perspective with the object image.

In contrast, according to this embodiment, the operator need not perform such operation, and the attitude matching is automatically performed by the CPU 24. Therefore, there is no need to display a perspective on the monitor. However, such display should preferably be effected in order to inform the operator of such particular positions as the node N1. If, as shown in the previous proposal, it is desired that graduations with a reference pitch be displayed while being superimposed on the object image so that the length of a crack, etc. can be measured with the eye, it is possible to effect a display similar to that in the previous proposal.

It would be clear that if, as shown in the previous proposal, a plurality of points in the vicinity of the portion to be examined are specified on the object image displayed, it is possible to measure the area of the examination portion. Further, it is possible to apply the present invention to the case where, as in the previous proposal, an image of the object is obtained by employing: a fiberscope and a TV camera; or a small TV camera.

Figure 16:
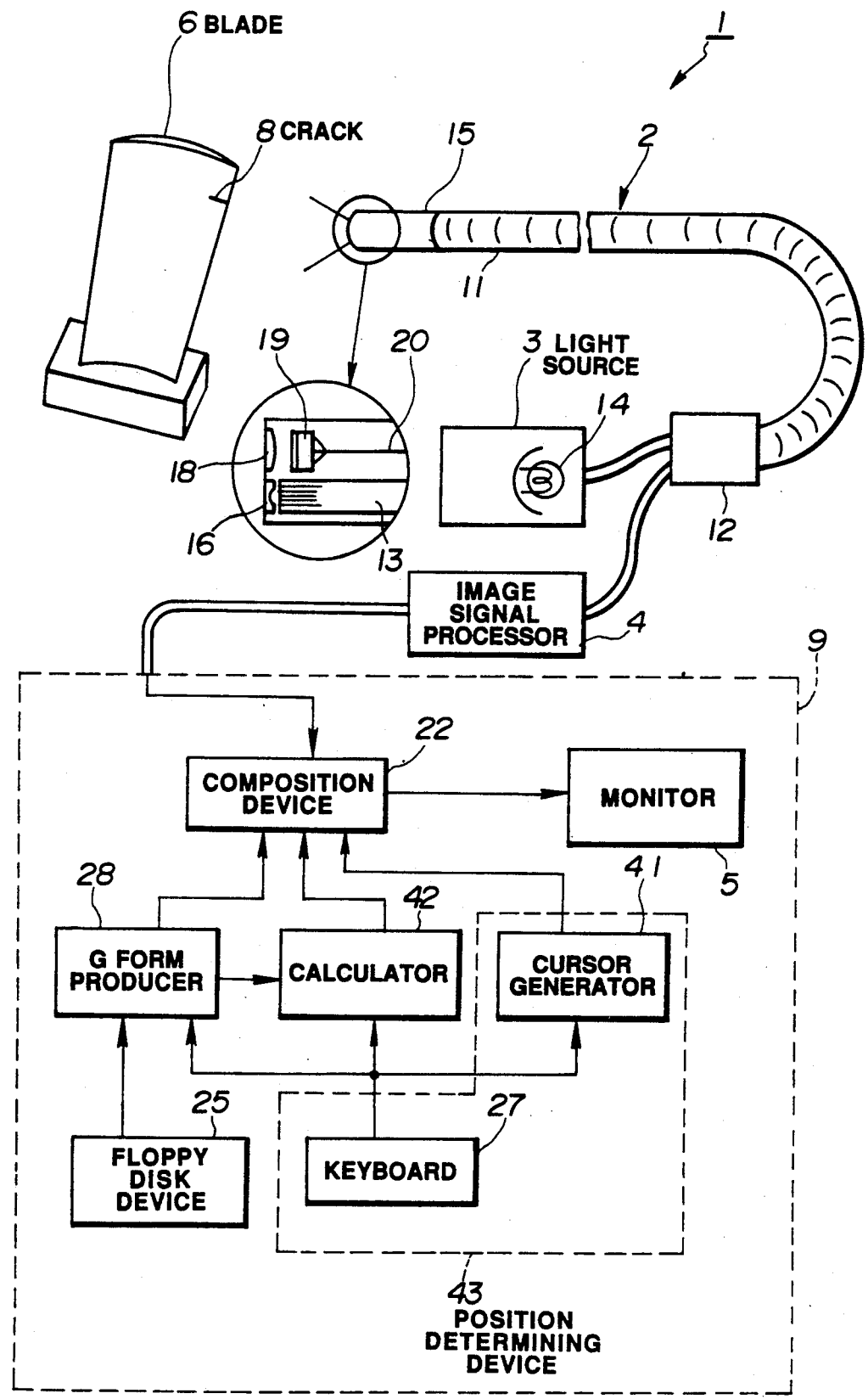
FIG. 16 is a diagram showing a modification of the measurement unit shown in FIG. 1.

FIG. 16 shows a modification of the measurement unit 9 shown in FIG. 1.

In this modification, a cursor generator 41 operates to generate a cursor K, such as that shown in FIGS. 5, etc., with a certain shape, and the generated cursor is displayed via the composition device 22 on the monitor 5. When the operator operates a cursor key on the keyboard or a mouse circuit, not shown, the cursor displayed on the monitor 5 is moved through the operation of the cursor generator 41 to the position specified in the direction specified. Data on the movement of the cursor is sent to the G form producer 28 as well as to a calculator 42 so that these devices monitor the current position of the cursor on the monitor screen.

When the operator specifies certain positions of the object image to which particular positions of the G form should correspond by suitably moving a cursor, the G form producer 28 operates on the basis of data on the specified positions on the monitor screen to vary the attitude of the G form in such a manner that the G form represents a substantially identical aspect of the object with that reproduced as the object image, in other words, the G form has the optimum attitude.

Thereafter, the operator operates on the keyboard and causes cursor movement so that a plurality of points which form a particular portion of the object to be examined have their position on the object image on the screen specified. Data on the specified position of these points is supplied to the calculator 42. The calculator 42 calculates, on the basis of the specified-position data, the position of these examination-portion-forming points in a three-dimensional space. This allows the actual length, area, etc., of the examination portion to be calculated. The result of the calculation is sent via the composition device 22 to the monitor 5, and is displayed in the manner shown in FIG. 13. Referring to FIG. 16, the keyboard 27 and the cursor generator 41 constitute a position determining device 43.

FIGS. 17 to 22 illustrate a second embodiment of an object measuring method according to the present invention.

Figure 17:
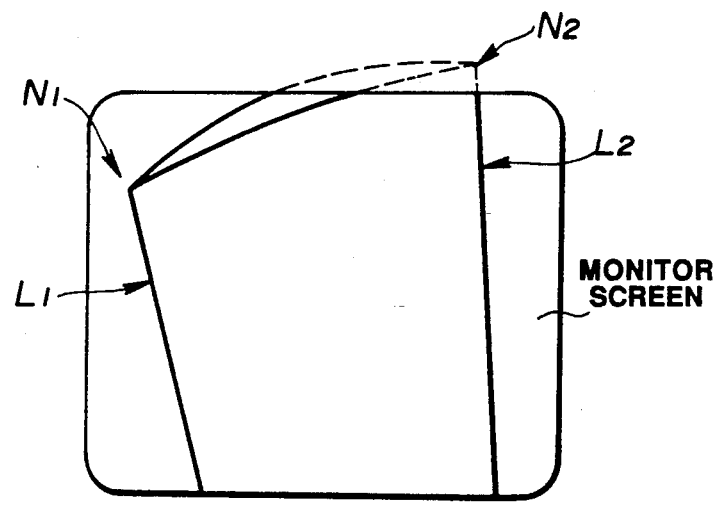

In FIG. 17, a certain position of the object image on the screen to which a node N1 should correspond is specified in a manner similar to that in the first embodiment (see FIG. 5). Since the position to be occupied by a node N2 is outside the screen, it cannot be specified.

Figure 18:
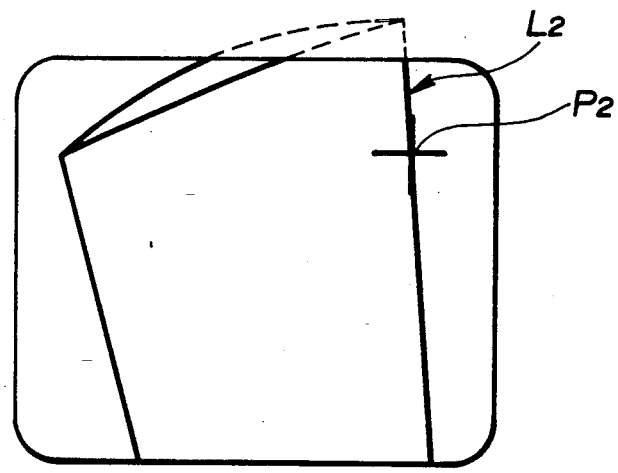

Subsequently, the position to be occupied by a point P3 on a straight line L1 is specified in a manner similar to that in the first embodiment (see FIG. 9). Then, the position to be occupied by another point P2 on another straight line L2 is specified, as shown in FIG. 18. The above-described is the all of the position specifying operation performed on the screen by the operator.

Figure 19:
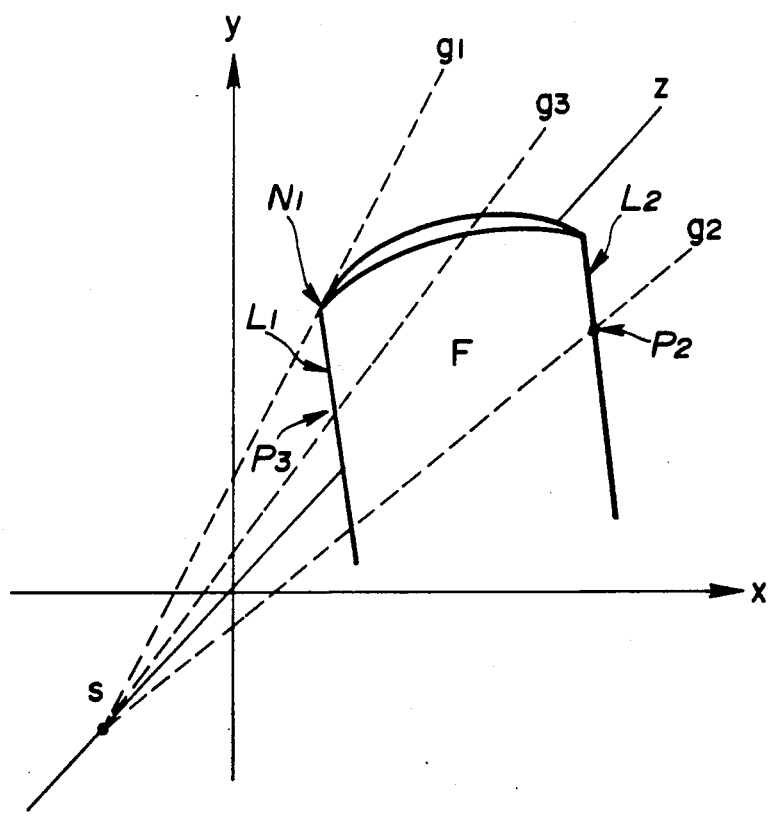

When the positions to be occupied by the points N1, P3 and P2 are specified on the screen, the straight lines g1, g3 and g2 shown in FIG. 19 are determined, as in the first embodiment. In FIG. 19, the symbol F denotes the entire three-dimensional G form. Since the optical system of an endoscope involves great distortion, the image of an object obtained by an endoscope is usually a distorted image. As a result, the positions specified on the screen for the points N1, P3 and P2 are those of a distorted image. Therefore, the specified positions are converted into distortion-free positions by removing the distortion through calculation.

Figure 20:
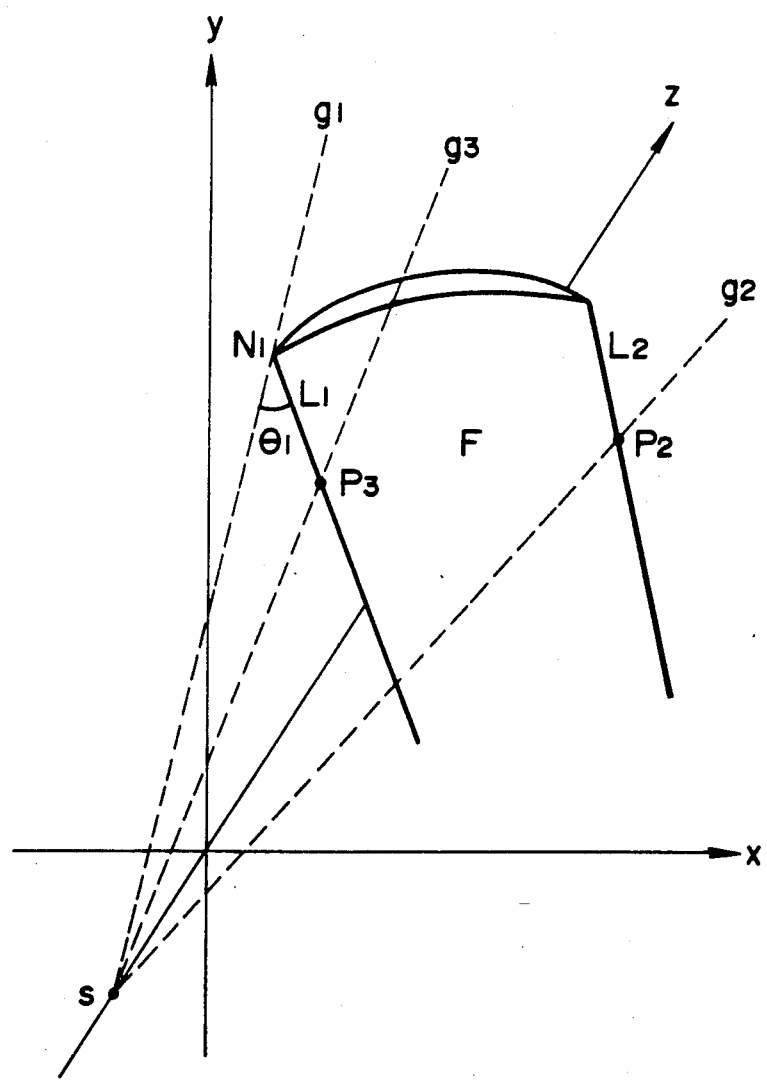

Subsequently, the CPU substitutes each of two parameters z1 and $\theta 1$ with a suitable initial value. The parameter z1 is the z coordinate of the node N1. When the parameter z1 is substituted by a suitable initial value, the node N1 is assumed to be at a suitable position on the straight line g1. The parameter $\theta 1$ is, as shown in FIG. 20, the angle between the straight lines L1 and g1. The CPU substitutes the angle $\theta 1$ with a suitable initial value such as 90° to begin with.

In the xyz three-dimensional coordinates, the respective positions of the straight lines g1, g3 and g2 are already fixed in the steps described above. In this condition, if the z coordinate of the node N1 is fixed by setting it to a certain value z1, the three-dimensional position of the node N1 is determined because the x and y coordinates of the node N1, a point on the straight line g1, are naturally determined.

The straight line L1 passes the node N1 and exists on the plane including the straight lines g1 and g3. Therefore, as shown in FIG. 20, if the angle $\theta 1$ between the lines L1 and g1 is set to a certain value, the position of straight line L1 in the three-dimensional coordinates is determined.

Figure 21:
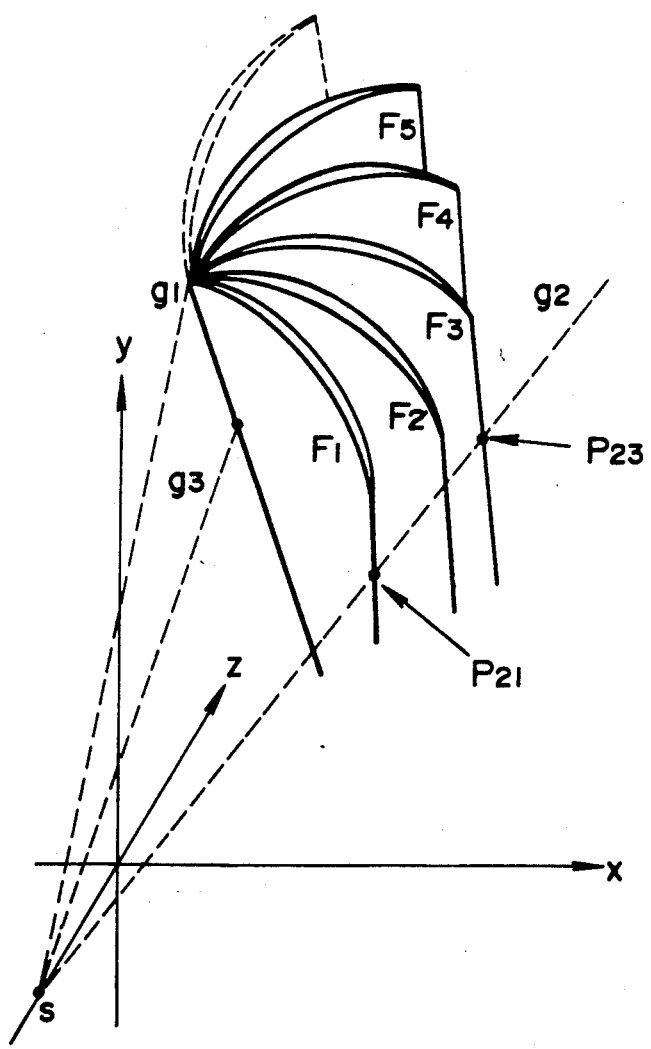

If the position of the node N1 and the straight line L1 are determined, the remaining degree of freedom in the attitude of the three-dimensional G form F consists only of the magnitude of rotation about the straight line L1 with the node N1 being fixed, that is, such possible rotational positions of the G form as F1, F2, F3 shown in FIG. 21. However, the straight line L2 of the G form F must cross the straight line g2, as shown in FIG. 20. Consequently, the possible rotational positions of the G form F consist only of F1 and F3 shown in FIG. 21. In general, the intersection of a straight line and a figure rotated in the manner shown in FIG. 21 occurs at two points P21 and P23.

Thus, when a certain z coordinate z1 and a certain angle $\theta 1$ are given, the rotational position that the G form F can have is one of the two definite rotational positions F1 and F3 shown in FIG. 21.

Figure 22:
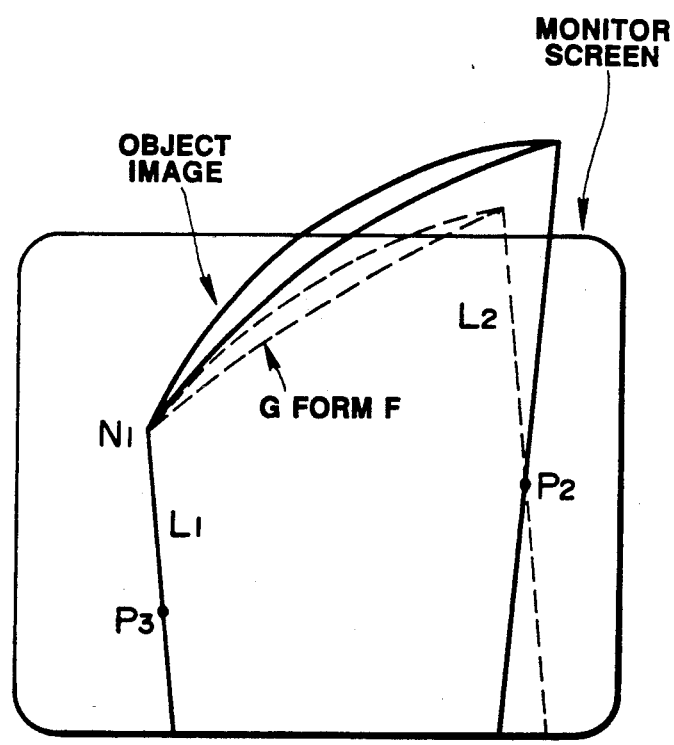
Figure 23:
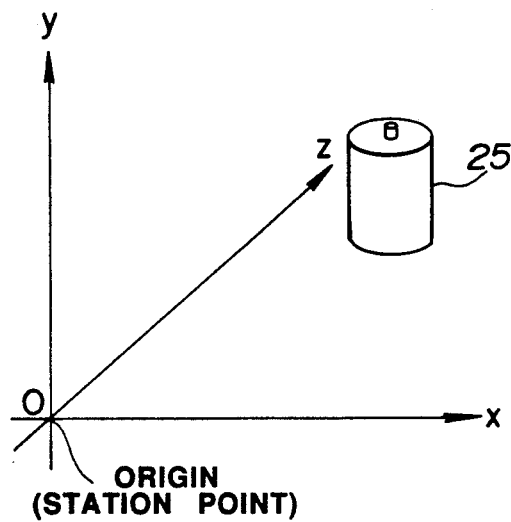
FIGS. 23 and 24 are views for explaining the art related to the present invention, FIG. 23 showing positional parameters for displaying a computer graphic image, FIG. 24 showing rotational-angle parameters for displaying such an image.
Figure 24:
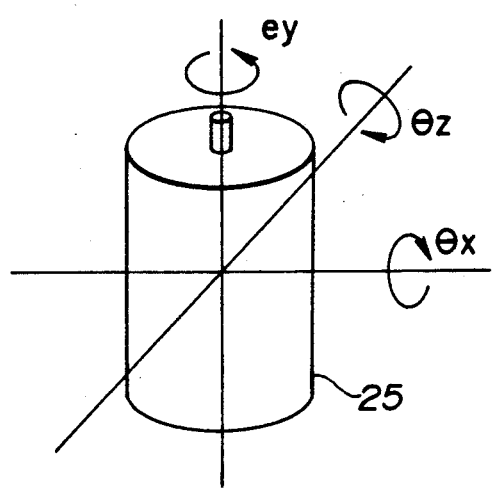

The above-described condition is displayed on the monitor screen as shown in FIG. 22. The solid lines indicate the object image, and the broken lines indicate the G form F. The object image and the G form F have the node N1 and the straight line L1 in common, and they cross each other at the point P2 on the straight line L2. Those portions of the image and the G form which are outside the monitor screen are not, as a matter of course, visible thereon.

The G form F displayed as shown in FIG. 21 is in the rotational position F1 or F3. The operator can select one of these positions F1 and F3 by a simple key operation. In displaying the G form F, the CPU adds distortion caused by the optical system so that the G form F is displayed under the same condition as the object image.

Thus, the G form F (shown in FIG. 22) is displayed under the assumption that the parameters z1 and $\theta 1$ have certain suitable values given by the CPU. Subsequently, the operator operates on the keyboard to arbitrarily increase and decrease the respective values of these parameters z1 and $\theta 1$. As will be understood from the explanation given above, even when the values of z1 and $\theta 1$ are varied, the positional relationship of the G form F and the object image in which they have in common the node N1 and the straight line L1, and in which they cross each other at the point P2, is maintained. With this positional relationship being maintained, the parameters z1 and $\theta 1$ are varied so as to vary the attitude of the G form F. Thus, while the operator observes the monitor screen displaying an image, such as that shown in FIG. 22, the operator can adjust the parameters z1 and $\theta 1$ by increasing or decreasing them in such a manner that the G form F is superimposed on the object image.

In the first embodiment, the operator must specify, on the monitor screen, the respective positions for the two nodes N1 and N2 and the two straight lines L1 and L2 (all shown in FIG. 4). This is possible when the object image obtained is such as that shown in FIG. 5. However, such an ideal image is not always available because it often happens in an inspecting operation employing an endoscope that the places the endoscope can be inserted into are inevitably limited. There are cases where, as in the second embodiment, the best available object image may, as shown in FIG. 17, lack the counterpart N2 of one of the two nodes of the object.

The second embodiment is therefore a method capable of superimposing the object-simulating G form on the object image, and measuring the desired quantity even when only such an image as that shown in FIG.

17, which might make the measurement difficult, is available.

Thus, according to the second embodiment, even when a part of the object, such as the node N2', is not visible on the monitor screen, as shown in FIG. 17, it is possible to superimpose the G form on the object image by specifying the respective positions of the screen image for the points N1, P2 and P3 shown in FIG. 19, and adjusting the two parameters z1 (the z coordinate of the node N1) and $\theta$1 (the angle shown in FIG. 20); thus, it is possible to perform measurement. The parameters can be adjusted through operations which are much easier than those required for varying many parameters. In addition, the second embodiment does not require, in contrast with the first embodiment, that both of the nodes N1' and N2' be displayed on the monitor screen; thus, the former is applicable to a wider range than the latter.

FIGS. 25 through 36 illustrate an image filing apparatus as an example to which is applied a method of, as well as an apparatus for, measuring an object by employing an imaging means according to the present invention.

Figure 26:
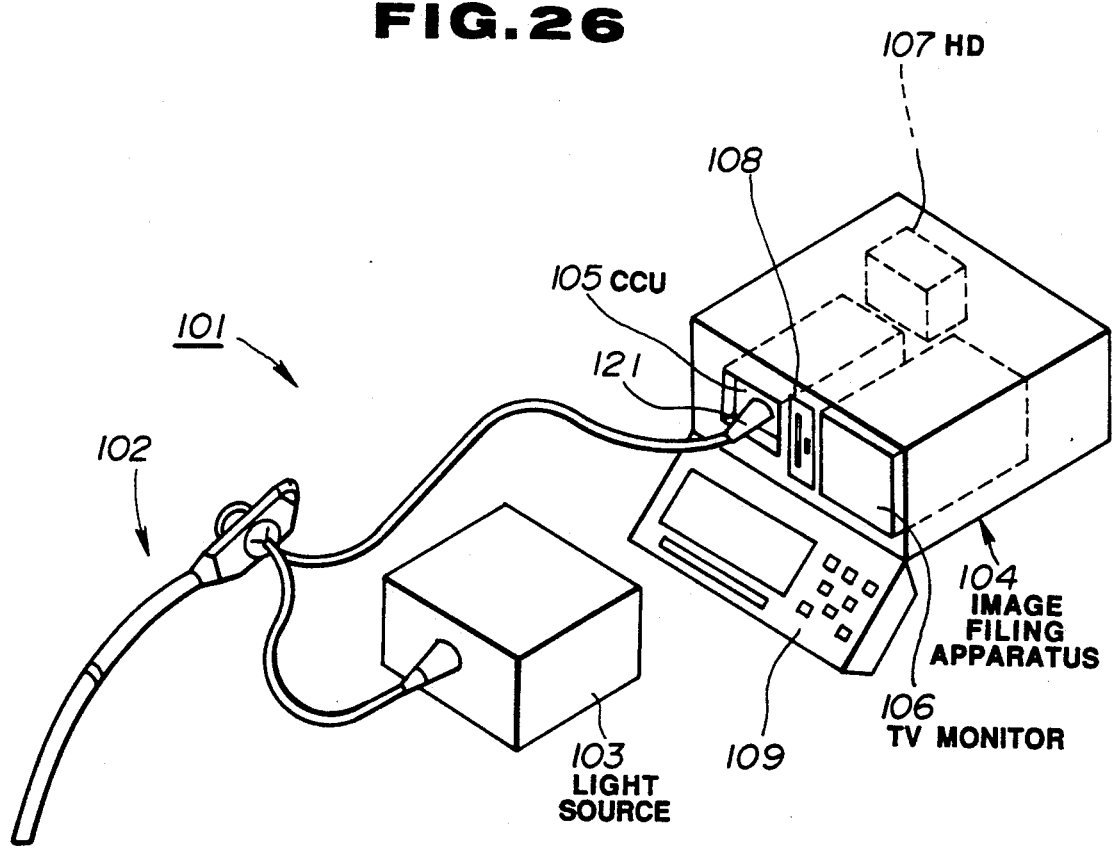

As shown in FIG. 26, an endoscope system 101 incorporating such an image filing apparatus basically comprises an electronic endoscope 102, a light source 103 for supplying illumination light to the electronic endoscope 102, and an image filing apparatus 104 serving as the above-described example and having such functions as processing a signal to or from the electronic endoscope 102 and displaying an image.

Figure 25:
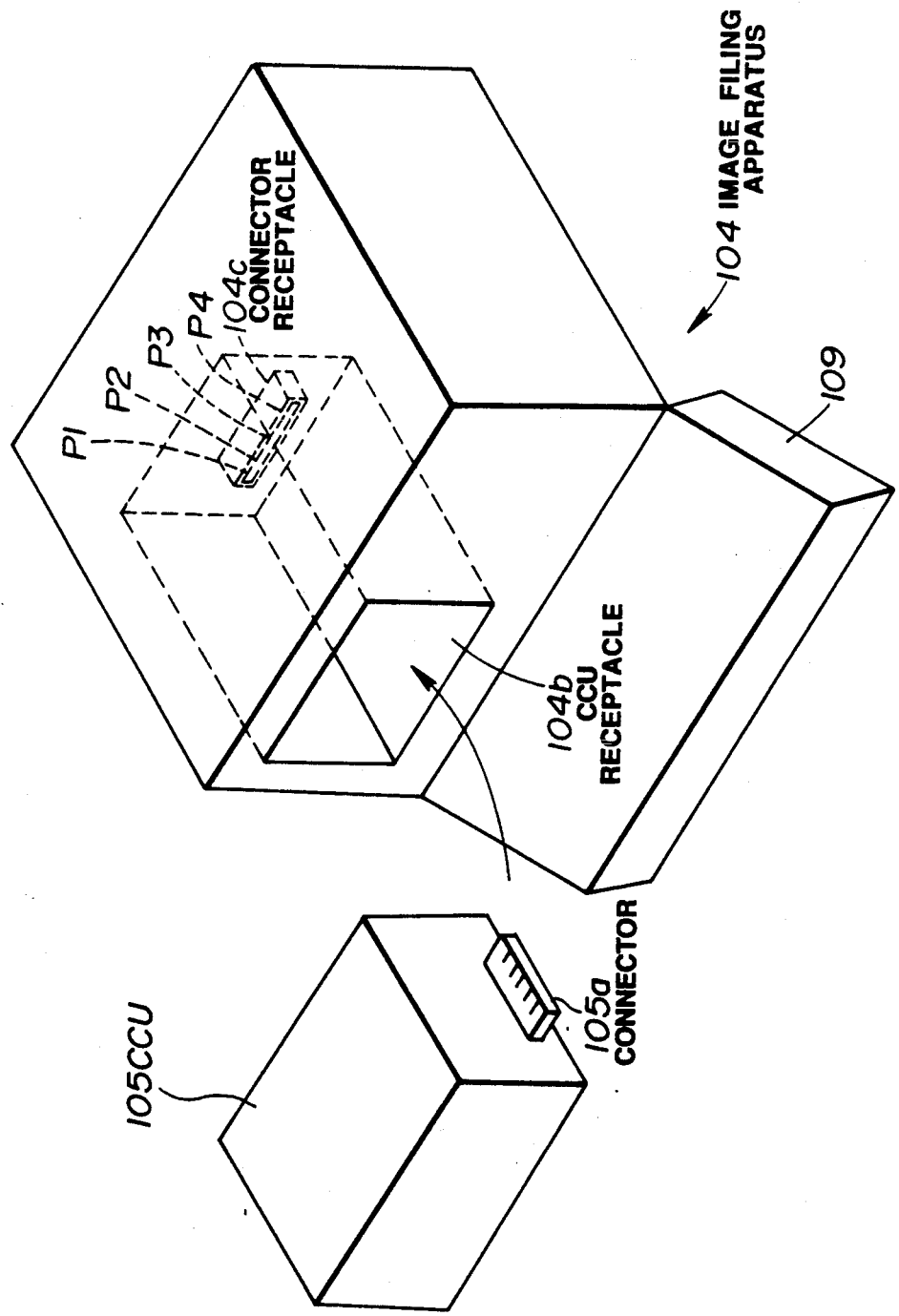

As shown in FIG. 25, the image filing apparatus 104 has a CCU 105 for processing a signal, a TV monitor 106 for displaying an image upon inputting a screen-image signal subjected to signal processing, a hard disk 107 and a floppy disk 108 for recording image data, etc., and a keyboard 109.

Figure 27:
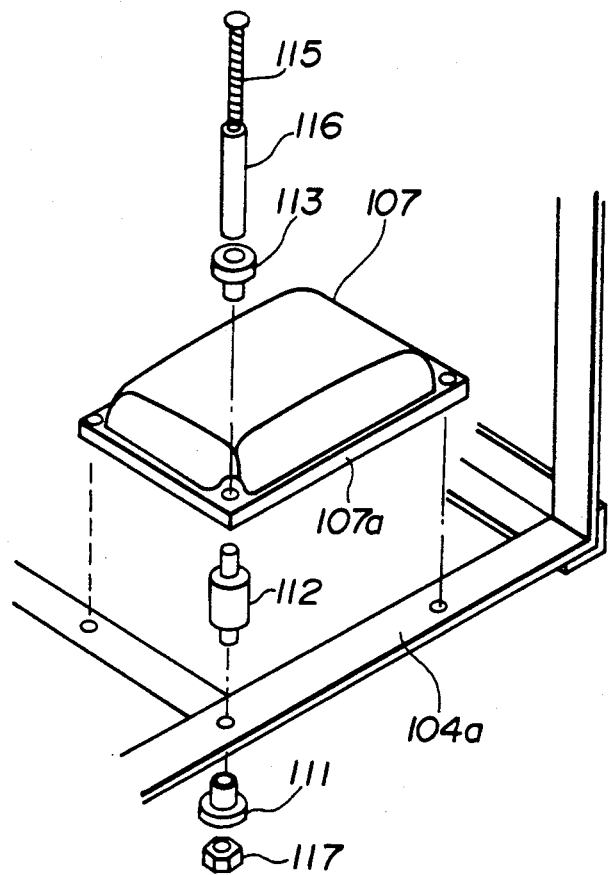
Figure 28:
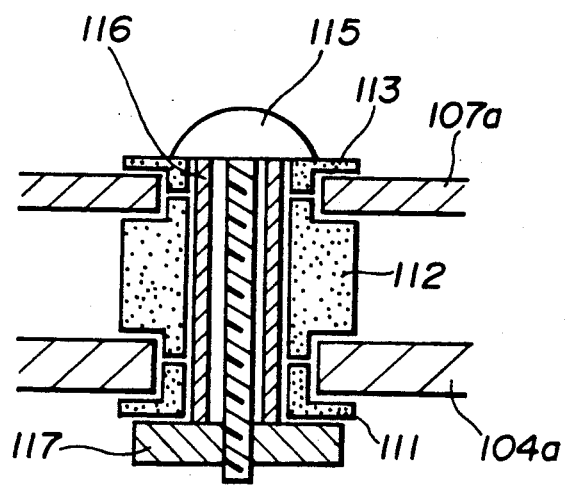

FIG. 27 shows the hard disk 107 fixed in position by an anti-vibration structure, and FIG. 28 shows a portion at which the hard disk 107 is fixed.

Referring to FIGS. 27 and 28, the hard disk 107 is fixed to a frame 104a of the image filing apparatus 104, with rubber bushes 111, 112 and 113 disposed therebetween.

Specifically, a rubber bush 112 is disposed between each of the four corners of a frame 107a of the hard disk 107 and a part of the frame 104a of the image filing apparatus 104. The bush 112 has small-diameter portions at either end thereof, which portions are inserted into holes in the frames 107a and 104a. A pipe-shaped spacer 116, with a machine screw 115 passed therethrough, extends through the inside of the rubber bush 112.

Further, rubber bushes 111 and 113 are disposed at either end of each bush 112, and surround two end portions of the spacer 116. The rubber bushes 111 and 113 have small-diameter portions inserted into the holes in the frames 104a and 107a. As a result, the frames 104a and 107a have their portions around the holes fitted in grooves defined by the stepped portions of the bushes 111 and 112 and the stepped portions of the bushes 112 and 113, respectively. The headless end of the machine screw 115 is threaded into a nut 117. Thus, the hard disk 107 is resiliently fixed to the frame 104a of the image filing apparatus 104 with the bushes 111, 112 and 113 therebetween.

Figure 29:
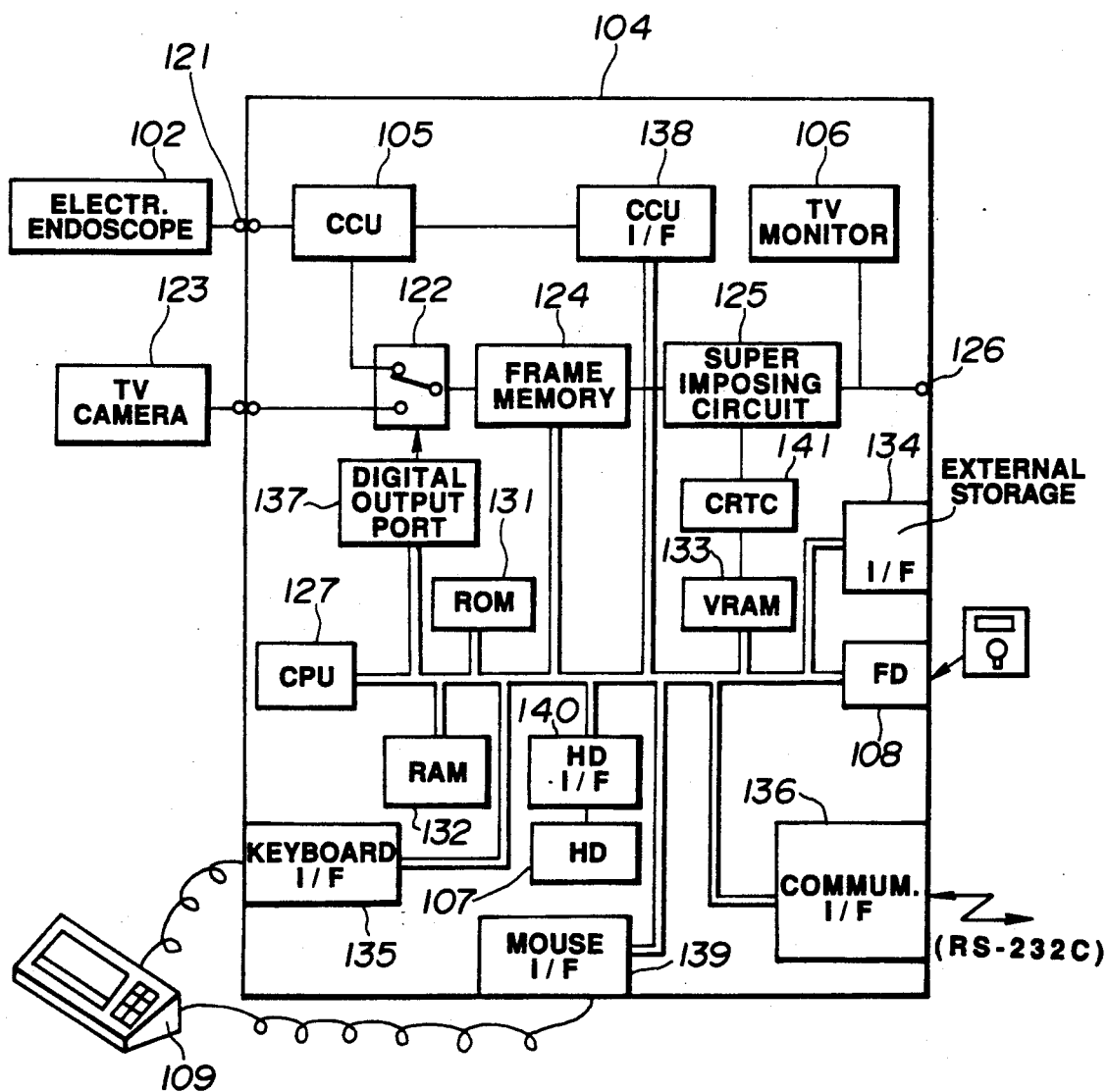

FIG. 29 shows the main internal arrangement of the image filing apparatus 104.

The electronic endoscope 102 of the system 101 is connected with the CCU 105 of the apparatus 104 by a signal cable connector 121 (see FIG. 26). A signal from the endoscope 102 is processed by the CCU 105 and converted into a typical screen-image signal, which is inputted to an input switching circuit (ISC) 122.

The ISC 122 inputs a screen-image signal from the CCU 105 as well as a screen-image signal from a TV camera 123, selects one of these screen-image signals, and sends the selected signal to a frame memory 124. An output from the frame memory 124 can either be inputted via a superimposing circuit 125 to a TV monitor 106 or be outputted via an output terminal 126 to an external system.

The image filing apparatus 104 includes a CPU 127, which is connected, via system buses, to a ROM 131, a RAM 132, the frame memory 124, a video RAM (VRAM) 133, an external storage interface (I/F) 134, a floppy disk 108, a keyboard interface 135, a communication interface 136, a digital output port 137, a CCU interface 138, a mouse interface 139, and a hard disk interface 140.

The VRAM 133 is connected via a CRT controller (CRTC) 141 with the superimposing circuit 125. The keyboard interface 135 is connected with the keyboard 109. The mouse interface 139 is connected with a mouse circuit (not shown) incorporated in the keyboard 109.

The CCU interface 138 allows a control signal to be outputted to the CCU 105 when the CCU 105 is mounted in the image filing apparatus 104.

The digital output port 137 is connected with a switching control terminal of the ISC 122 so that, in accordance with a signal outputted to the port 137, the switching operation of the ISC 122 can be controlled.

Figure 30:
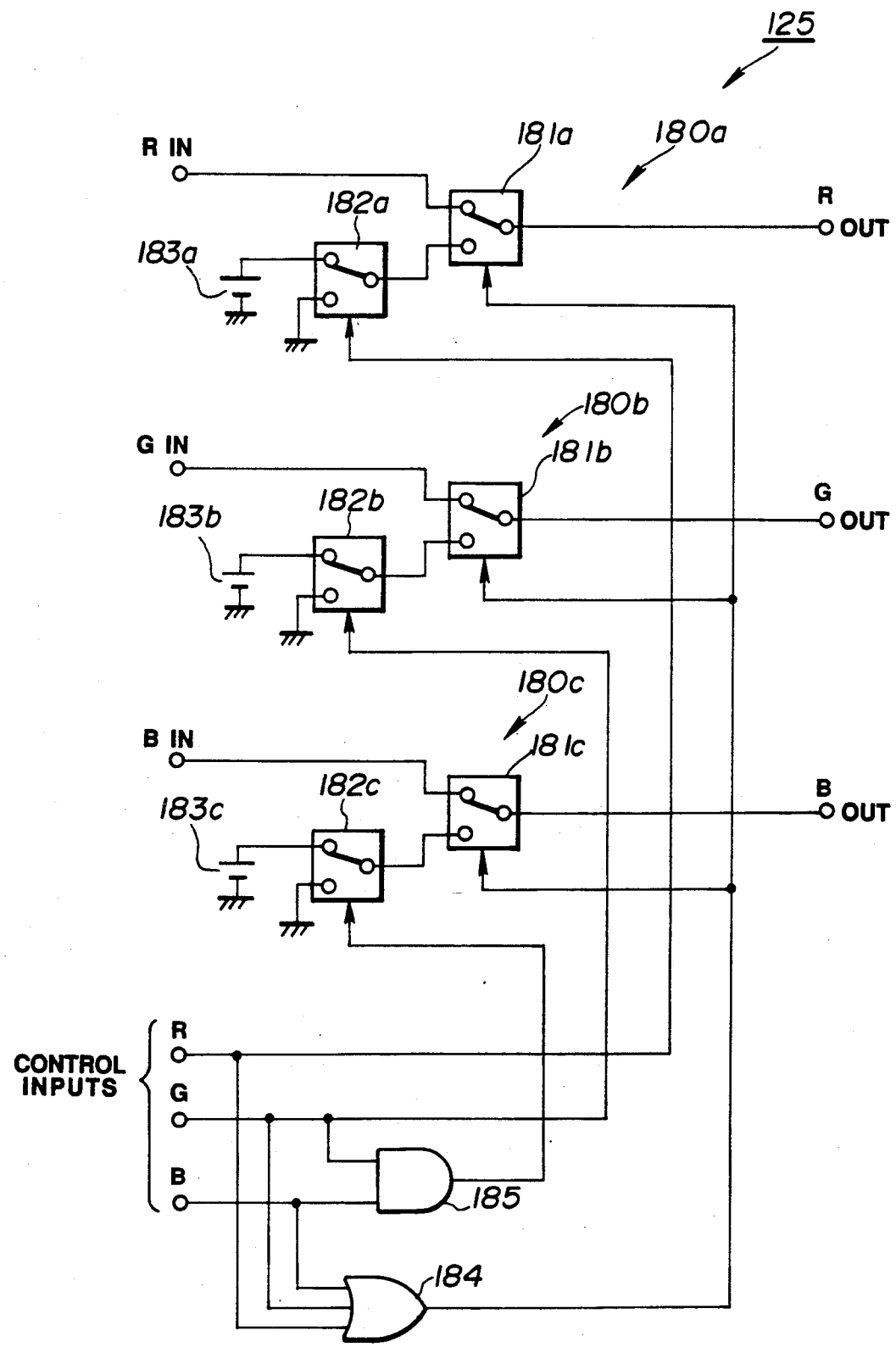

FIG. 30 shows a specific arrangement of the superimposing circuit 125.

A signal outputted from the frame memory 124 shown in FIG. 29, that is, R-, G- and B-signals constituting a screen-image signal is inputted to first switches 181a, 181b and 181c forming parts of R-, G- and B-switching circuits 180a, 180b and 180c, respectively. The first switches 181a, 181b and 181c have input terminals other than those for inputting a screen-image signal, that is, input terminals connected to the respective output terminals of second switches 182a, 182b and 182c. Each of the second switches 182a, 182b and 182c has two input terminals, one being connected to a reference power source 183a, 183b or 183c, the other being connected to the ground (i.e., the black level of a video signal).

The switching action of each of the first switches 181a, 181b and 181c of the R-, G- and B-switching circuits 180a, 180b and 180c is controlled by the output of a first gate 184 composed of a three-input OR circuit. The first gate 184 inputs R-, G- and B-control inputs.

The switching action of each of the second switches 182a, 182b and 182c is controlled by R- and G-control inputs, and the output of a second gate 185. The second gate 185 is composed of a two-input AND circuit which inputs G- and B-control inputs.

The above-described R-, G- and B-control inputs are supplied from the output terminal of the CRTC 141.

Figure 31:
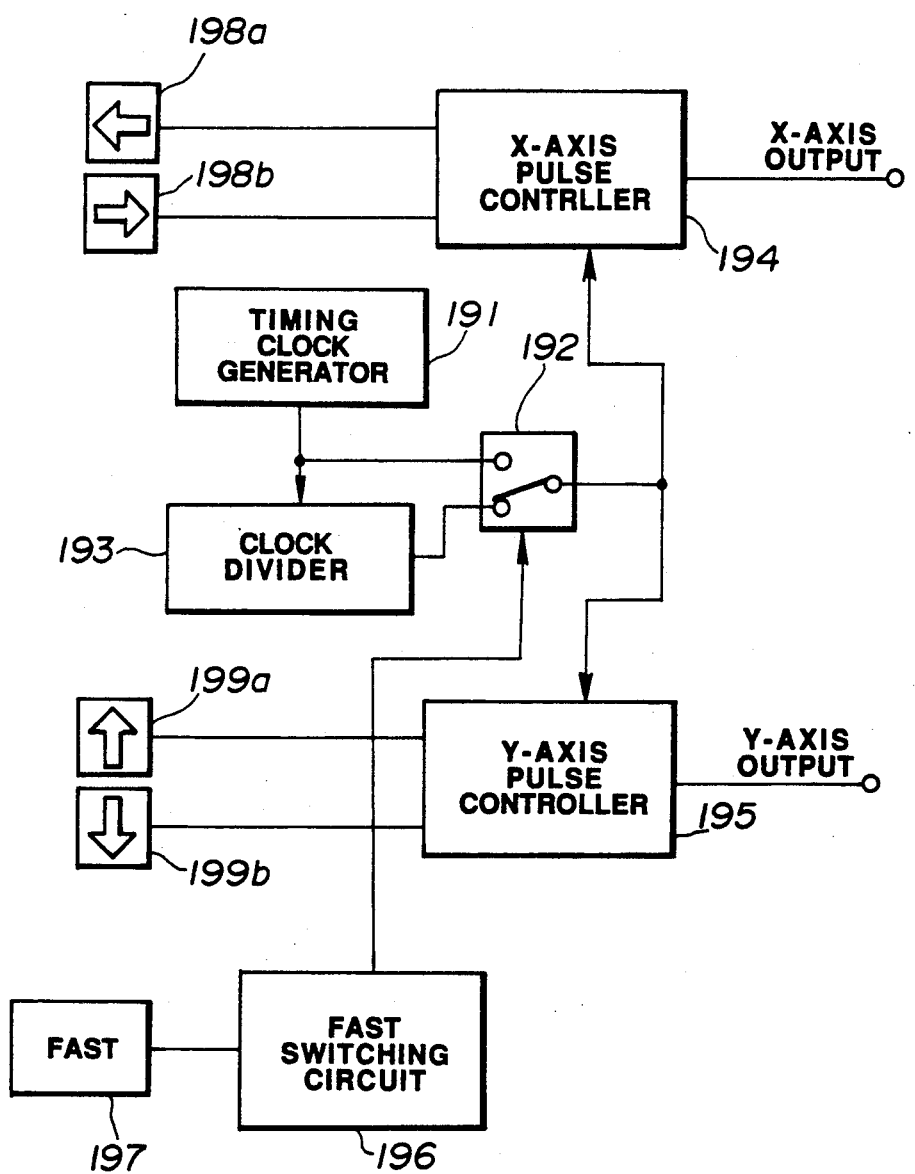

FIG. 31 shows the arrangement of the mouse circuit.

An output from a timing clock generator 191 is applied to an input terminal of a switch 192 as well as to the output terminal of a clock divider 193. The output of the switch 192 is applied to the input terminal of an X-axis pulse controller 194 and the input terminal of a Y-axis pulse controller 195. The switch 192 has a switching control terminal connected with the output terminal of a FAST switching circuit 196. The FAST switching circuit 196 inputs a signal inputted through a FAST button 197.

The X-axis pulse controller 194 is connected with LEFT- and RIGHT-cursor buttons 198a and 198b. The output of the X-axis pulse controller 194 is inputted as an X-axis output of the mouse circuit to the mouse I/F 139.

Similarly, the Y-axis pulse controller 195 is connected with UP- and DOWN-cursor buttons 199a and 199b. The output of the Y-axis pulse controller 195 is inputted as a Y-axis output of the mouse circuit to the mouse I/F 139.

Figure 32:
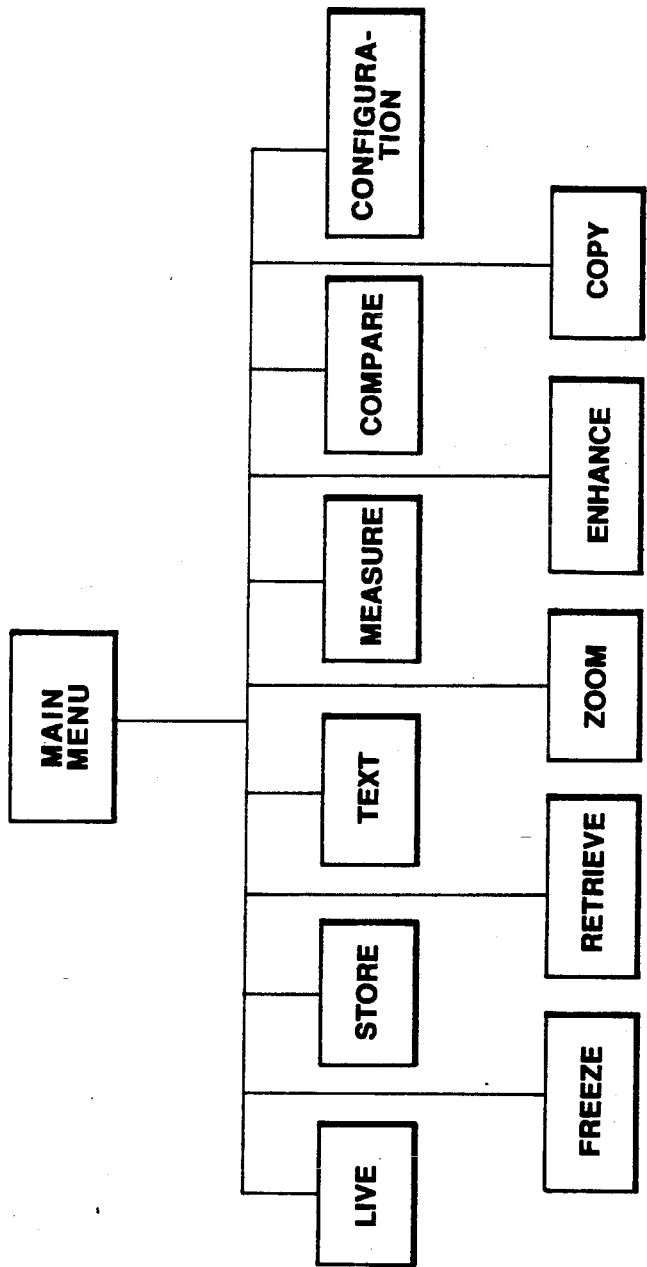

FIG. 32 shows the arrangement of software. The main menu includes such functions as LIVE, FREEZE, and CONFIGURATION, and allows one of the functions to be selected.

In the example being explained, the image filing apparatus 104 has, as shown in FIG. 25, a CCU receptacle 104b (accommodating section) formed therein for removably mounting the CCU 105. The innermost wall of the receptacle 104b has a connector receptacle 104c engageable with a connector 105a on the rear surface of the CCU 105. When the CCU 105 is inserted into the receptacle 104b and pushed inward, as indicated by the arrow in FIG. 25, the connector 105a fits in the connector receptacle 104c, thereby setting the CCU 105 in its mounted position.

The connector receptacle 104c includes a power source contact P1, a screen-image signal contact P2, an automatic gain (AG) control contact P3 and a white balance (WB) adjustment control contact P4. When connection is established between the connector 105a and the connector receptacle 104c, power is supplied from the image filing apparatus 104 to the CCU 105, and a screen-image signal is outputted from the CCU 105 to the image filing apparatus 104. Further, the connection allows the CCU 105 to input control signals for automatically setting AG and WB to appropriate conditions.

The operation of the endoscope system 101 having the above-described construction will be described.

Examination is performed with the system 101 in the following manner when the CCU 105 is mounted in the image filing apparatus 104.

As shown in FIG. 26, the light guide of the electronic endoscope 102 is connected with the light source 103. The signal cable of the electronic endoscope 102 is connected with the CCU 105 set in the image filing apparatus 104.

As is well known, illumination light from the light source 103 is transmitted through the light guide to the front end of the endoscope 102. The endoscope 102 has an illumination window through which the light led through the light guide is projected toward an object, or the subject of observation.

An image of the object illuminated by the illumination light from the endoscope 102 is formed by the observation optical system provided at the front end of the electronic endoscope 102 on the CCD also provided at the front end of the endoscope 102. The CCD converts the image into an electrical signal indicative of the image, which is supplied to the CCU 105.

The CCU 105 converts the signal into a screen-image signal which can be seen on the TV monitor 106.

In an examining operation employing an endoscope, observation is possible, usually, by observing an image obtained by the electronic endoscope 102 and displayed on the screen of the TV monitor 106 of the image filing apparatus 104.

The TV monitor 106 displays the main menu when suitable keys on the keyboard 109 of the apparatus 104 are operated.

Figure 33:
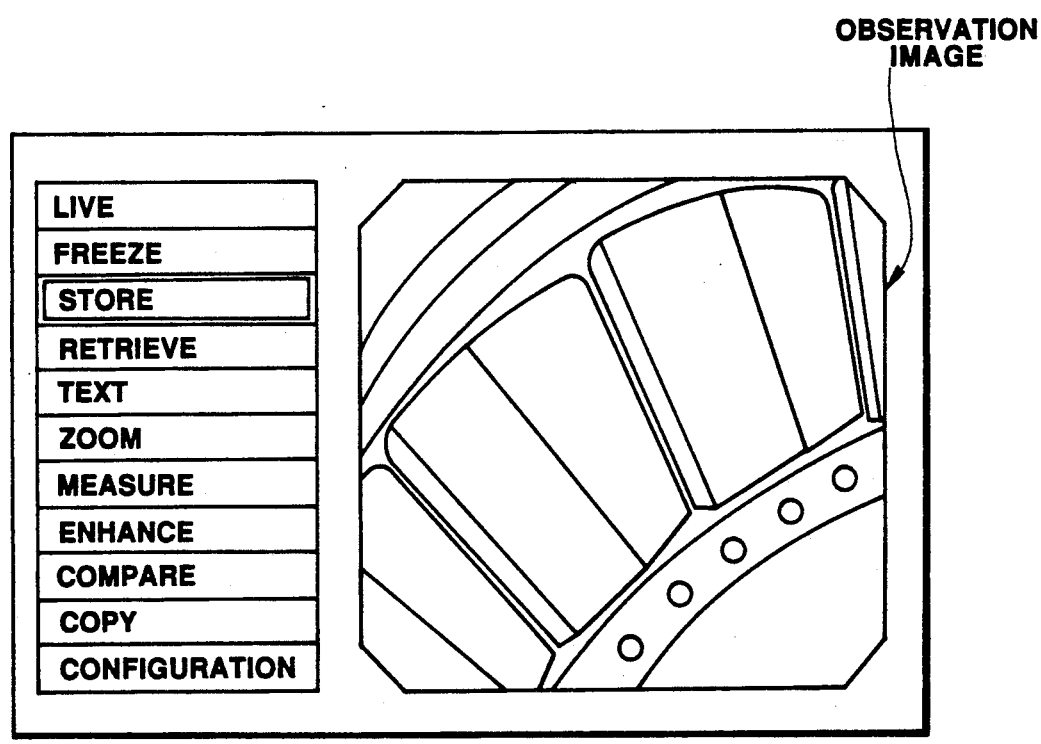

FIG. 33 shows an example of the main menu displayed.

An observation image obtained by the electronic endoscope 102 is displayed within a window on the right side of the screen. The main menu is displayed on the left side.

In the example shown in FIG. 33, the function STORE is selected, with a cursor being set at the title of the function, creating a framed image thereof.

In this condition, when an "EXECUTE" key of the keyboard 109 is depressed, the observation image is recorded. Other functions are executed by a similar procedure.

Referring to FIG. 29, the operation of the internal arrangement of the image filing apparatus 104 will be described.

As described before, the input switching circuit 122 inputs screen-image signals from the CCU 105 and the TV camera 123. The CPU 127 operates through the digital output port 137 to control the ISC 122 so that one the inputted screen-images is selected to be observed.

The screen-image signal selected by the ISC 122 is inputted to the frame memory 124, in which the image is frozen, recorded, etc. in accordance with necessity.

An output of the frame memory 124 is inputted to the superimposing circuit 125, by which information such as characters or icons to be displayed on the screen is superimposed.

An output of the superimposing circuit 125 is sent to the TV monitor 106 of the image filing apparatus 104 so that the endoscope image on which information from the CRTC 141 is superimposed can be observed on the monitor screen.

In the internal arrangement of the apparatus 104, the system buses include a CPU bus connected with the ROM 131 so that software can be read by the CPU 127. The CPU bus also connects the CPU 127 with the keyboard interface 135 and the like so that the CPU 127 can be controlled.

Specifically, a key signal from the keyboard 109 is sent via the keyboard I/F 135 to the CPU bus so that the key condition is read by the CPU 127.

Similarly, the condition of the mouse circuit is read by the CPU 127 via the mouse I/F 139.

The CPU bus is also connected with the hard disk 107 via the hard disk I/F 140 so that it is possible to store software and data such as data on images to be stored which cannot be stored in the ROM 131 due to its limited capacity.

The frame memory 124 is also connected to the CPU bus so that it is possible to read the inputted image, or to display an image processed by the CPU 127.

Also connected to the CPU 127 is the VRAM 133, so that the CPU 127 can send data on characters or images to be superimposed. The VRAM 133 is composed of a dual-port memory, and has its output connected to the CRTC 141 The CRTC 141 operates on the basis of the character information or the like from the VRAM 133 to send, as superimpose information to be added to the screen-image, the data on the characters, etc. to be superimposed to the superimposing circuit 125.

The CPU bus is also connected with the communication I/F 136 so that, when the interface 136 is connected with external communication equipment, it is possible to perform data communication. In this example, RS-232C interface is provided.

The CPU bus is also connected with the floppy disk 108 so that data can be recorded thereon. Thus, an image or images requiring a small recording capacity can be easily recorded.

The external storage I/F 134 (in accordance with the SCSI standards, in this example) is also connected to the CPU bus so that it is possible to send data in the system to an external storage such as a hard disk, an optical disk or a photomagnetic disk.

The CCU I/F 138 is also connected to the CPU bus so that the CPU 127 can detect the connection of the CCU 105 and send a signal for the control of the CCU 105 thereto.

Referring to FIG. 30, the operation of the superimposing circuit 125 will be described.

The CRTC 141 supplies the superimposing circuit 125 with R-, G- and B-control signals (superimpose signals) bit by bit. On the bases of these three signals, the circuit 125 performs superimposition on R-, G- and B-signals from the frame memory 124.

The R-, G- and B-signals, constituting a screen-image signal, is respectively inputted to the first switches 181a, 181b and 181c of the superimposing circuit 125. These first switches 181a, 181b and 181c respectively switch, on the basis of the R-, G- and B-control signals, the inputted R-, G- and B-signals and the respective outputs of the second switches 182a, 182b and 182c.

The second switches 182a, 182b and 182c respectively switch, on the basis of the control signals from the CRTC 141, the potential of the reference power sources 183a, 183b and 183c which corresponds to the white level of the screen-image signal, and the ground level corresponding to the black level.

Table 2 shows the R-, G- and B-control signals and corresponding superimposed conditions resulting from the superimposition of these control signals.

In the Table 2, the indication "transparent" means that the inputted screen-image signal is outputted without superimposition. The indication "black" means that no image is output on the screen, that is, the screen image is entirely "black".

TABLE 2

| R | G | B | COLOR |
|---|---|---|---|
| 0 | 0 | 0 | TRANSPARENT |
| 1 | 0 | 0 | RED |
| 0 | 1 | 0 | GREEN |
| 0 | 0 | 1 | BLACK |
| 1 | 1 | 0 | YELLOW |
| 1 | 0 | 1 | RED |
| 0 | 1 | 1 | LIGHT BLUE |
| 1 | 1 | 1 | WHITE |

With the above-described arrangement, it is possible to superimpose characters on a common endoscope signal, or to add a black, background-frame to a character image.

FIG. 31 is a block diagram showing the mouse circuit.

The timing clock generator 191 electrically generates pulses corresponding to movement of the mouse.

The clock divider 193 divides the frequency of the pulses received from the clock generator 191 so as to form a slow-timing signal whose frequency is $\frac{1}{2}$, $\frac{1}{3}$ or the like of that of the received pulses.

When the LEFT- or RIGHT-cursor button 198a or 198b is depressed, the X-axis pulse controller 194 outputs X-axis pulses based on the clock generated by the timing clock generator 191.

Similarly, when the UP- or DOWN-cursor button 199a or 199b is depressed, the Y-axis pulse controller 195 outputs Y-axis pulses based on the clock generated by the timing clock generator 191.

So long as the FAST button 197 is released, the switch 92 is in its position for switching the timing clock to the output from the clock divider 193 so that the X-axis and Y-axis pulse controllers 194 and 195 output pulses having long periods. As a result, a small number of pulses are output during a period in which the LEFT-, RIGHT-, UP- or DOWN-cursor button 198a, 198b, 199a or 199b is depressed. On the other hand, when the FAST button 197 is depressed, the outputted pulses have a short period, resulting in a large number of pulses being outputted during a period of depression of the button 198a, 198b, 199a or 199b. In this way, it is possible to switch the speed at which a cursor is moved.

Referring to FIG. 32 showing the software arrangement, the operation of the software will be described.

When the function LIVE is selected, the screen-image signal currently inputted is displayed on the TV monitor 106 of the image filing apparatus 104 so that the image obtained by the electronic endoscope 102 can be observed.

When the function FREEZE is selected, the image currently observed is frozen so that it is displayed as a frozen image. Thus, an image requiring careful observation can be observed as a frozen image.

When the function STORE is selected, the image currently displayed is stored as image data on the hard disk 107. Even when the displayed image is not frozen, it is frozen upon a STORE command, and the frozen image is stored.

When the function RETRIEVE is selected, image data is retrieved from the HD 107, the FD 108 or the external storage, and transmitted to the frame memory 124 so that the image data can be displayed on the TV monitor 106 for observation.

A retrieval is effected on the basis of either key word(s) or the date, and the operator can select whether the retrieval should be based on key word(s) or the date.

It is also possible to effect a divisional display of a plurality of, e.g., eight, sequential images on the TV monitor 106 by selecting an image which leads the sequential images, and then reducing the size of the images.

When the function TEXT is selected, it is possible to superimpose character data on the image being displayed at any position thereof. At this time, an image can be retrieved on the basis of certain character data inputted in a key word column on the screen. The character information thus inputted can be recorded in a storage simultaneously with the storing of the image information. It is also possible to change the character data accompanying an image retrieved and displayed. Further, the character data recorded on the retrieved and displayed image can be changed.

When the function ZOOM is selected, a rectangular cursor appears on the screen, and the cursor can be moved by operating the cursor keys on the keyboard 109. When the cursor is stopped at the desired position, and a "DEFINITION" key is depressed to make this position definite, it is possible to display the image enclosed by the cursor on the entire area of the screen. Such an image can be stored.

When the function MEASURE is selected, it is possible to perform measurement such as that shown in the first embodiment.

When the function ENHANCE is selected, it is possible to select an enhancement of either the contrast or edge(s) of the image currently observed, and the image is subjected to the selected enhancement. The image resulting from the enhancement can be stored, similarly to the case of the function ZOOM.

When the function COMPARE is selected, the procedure shown in the flowchart in FIG. 34 is executed. The procedure will be described below with reference to FIG. 34.

When the screen image is not frozen, a freezing is performed beforehand. With respect to a frozen image, such as that shown in FIG. 35A, two cursors K1 and K2 are displayed. The space between the cursors K1 and K2 corresponds to one half of the screen image. Operating on the cursor key 198a or 198b allows the cursors K1 and K2 to be moved leftward or rightward. Thus, the cursors K1 and K2 are moved until they are positioned at the position where the screen image should be scissored, thereby specifying the cut-off position in Step S1.

The "DEFINITION" button is depressed, thereby rendering the cut-off position definite. Then, in Step S2, a menu for an image retrieval is displayed on the screen, the menu being similar to what displayed upon the selection of the function RETRIEVE. An image retrieval is performed so that an image is retrieved and displayed.

In Step S3, a cut off position specifying operation, similar to the above-described operation, is performed with respect to the retrieved image.

When the second cut-off position is rendered definite by depressing the "DEFINITION" button, a divisional display is executed in Step S4. As shown in FIG. 35B, a frozen image PF is displayed on the left half of the screen and, simultaneously, a retrieved image PS is displayed on the right half. When two such images are displayed simultaneously, they can be compared with each other. These images can be stored in exactly the same state as they are displayed.

Referring again to FIG. 32, when the function COPY is selected, it is possible to effect a copying or moving of an image. Specifically, an image is retrieved, as in the case of the function RETRIEVE, and a selection is made as to whether the image is to be copied or moved.

Figure 36:
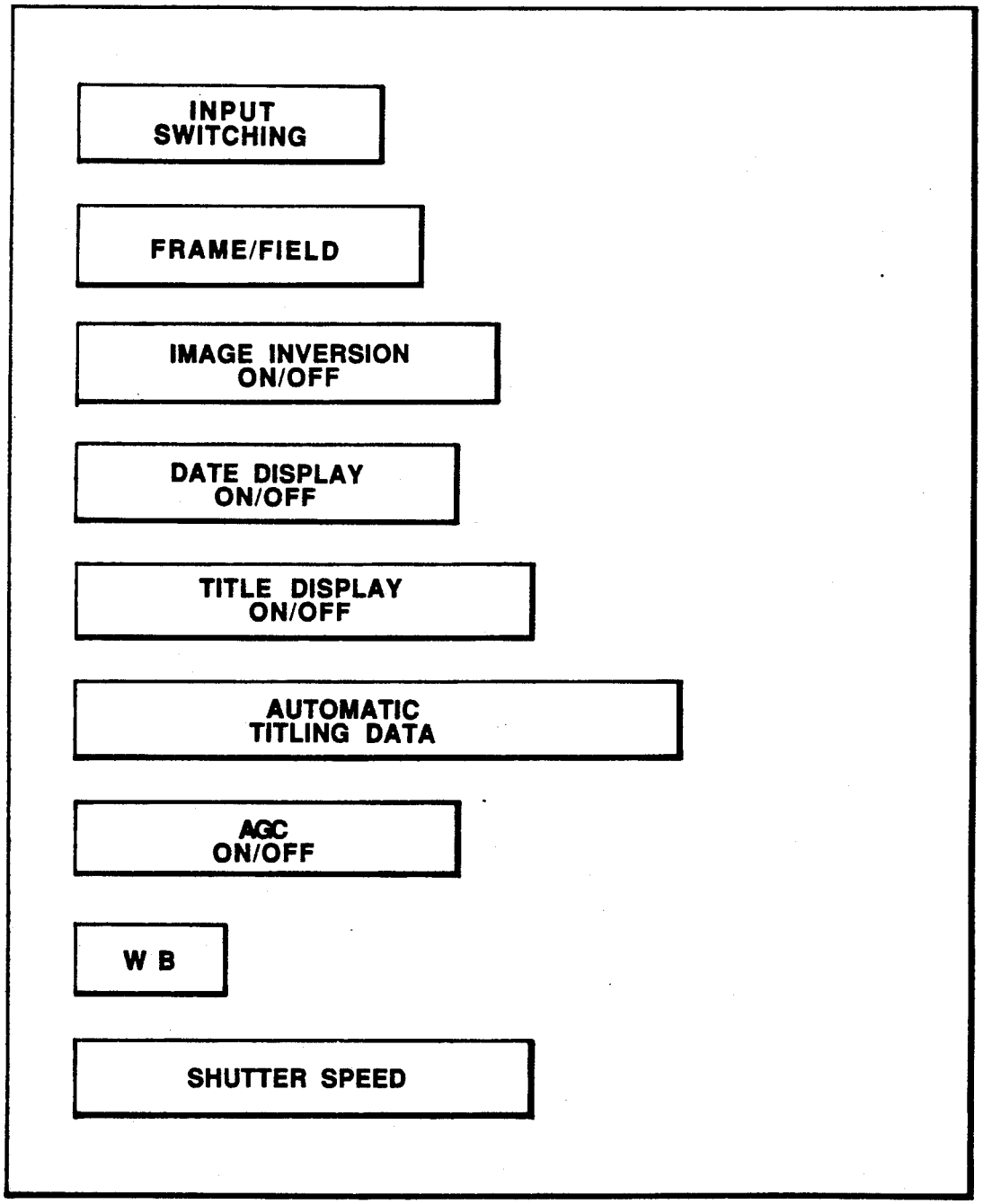

When the function CONFIGURATION is selected, a menu for setting the operating condition of the image filing apparatus 104 is displayed. FIG. 36 shows such a menu including the following items.

The item INPUT SWITCHING allows switching between the two types of image that can be observed, by switching from the image signal from the CCU 105 connected with the electronic endoscope 102 to the image signal from the TV camera 123, or vice versa.

The item FRAME/FIELD allows a selection as to, when a frozen image is to be recorded, whether a frame recording or a field recording is to be effected.

The item IMAGE INVERSION ON/OFF allows a selection as to whether or not the function of converting an inverted image, which occurs with an endoscope employing a prism, into a non-inverted image is to be used.

The item DATE DISPLAY ON/OFF allows a setting as to, during a normal observation, whether or not the date is to be displayed on a part of the screen.

The item TITLE DISPLAY ON/OFF allows a setting as to whether or not a title is to be displayed on a part of the screen.

The item AUTOMATIC TITLING DATA allows certain character data to be set so that, when an image is recorded without inputting its title, a title is automatically created and stored together with the image. The automatic titling enables the image to be easily retrieved.

The item AGC ON/OFF allows a setting as to whether or not the automatic gain control is to be effected by CCU 105. This item is included in the menu, hence, displayed only when the CCU 105 is mounted in the apparatus 104.

The item WB is a white balance switch for commanding the CCU 105 to obtain appropriate white balance. This item is included in the menu, hence, displayed only when the CCU 105 is mounted in the apparatus 104.

The item SHUTTER SPEED allows, when an element shutter is used, the storage time to be set.

Referring again to FIG. 25, the removal mounting of the CCU 105 in the image filing apparatus 104 will be described.

When the CCU 105, led by its connector 105a on the rear surface, is inserted into the CCU receptacle 104b of the image filling apparatus 104, and pushed inward, the connector 105a engages with the connector receptor 104c on the innermost wall of the CCU receptacle 104b. Upon this engagement, power is supplied from the image filing apparatus 104 through the power source contact P1 to the CCU 105, thereby actuating the CCP 105.

The connector receptacle 104c includes the screen-image signal contact P2 through which a screen-image signal from the CCU 105 is sent to the image filing apparatus 104. The receptacle 104 further includes the AG control contact P3 and the WB adjustment control contact P4 so that the CPU 127 can control the AG and the WB via the CCU I/F 138. Thus, the CCU 105 can be controlled by certain operation included in the menu displayed on the TV screen.

As described before with reference to FIGS. 27 and 28, the HD 107 is fixed to the frame 104a with the resilient members, i.e., the rubber bushes 111, 112 and 113, between the frames 104a and 107a. Therefore, there is no risk of the HD 107 being broken even when the apparatus 104 is subjected to vibration.

When the CPU 105 is not mounted in the image filing apparatus 104, the input to the apparatus is switched, on the CONFIGURATION menu, to an image signal from the TV camera 123 so that an image obtained by the camera 123 is observed.

Operations performed in this case are exactly the same as those performed when the CCU 105 is mounted in the apparatus 104 except that the CONFIGURATION menu does not include the items for controlling the AG, the WB and the shutter speed.

The TV camera 123 may be substituted with a common TV camera, or a fiberscope connected view an adapter for allowing a fiberscope image to be observed. Alternatively, a capsule-type remote-control TV camera may be connected. In this case, the remote-control camera may be supplied with power through contacts, such as those featured in the present invention, and may be remote-controlled by the image filing apparatus 104 with respect to the AG, the WB, etc.

The rubber bushes 111, 112 and 113 used to fix the hard disk 107 to the frame 104a may be substituted by one or more elastic members surrounding the hard disk fixed to the frame.

In this invention, it is apparent that working modes different in a wide range can be formed on the basis of this invention without departing from the spirit and scope of the invention. This invention is not restricted by any specific embodiment except being limited by the appended claims.

What is claimed is:

1. A method for measuring an object by employing an imaging means, comprising:
   obtaining an image of an object whose overall shape and dimension are already known by means of an imaging means, and displaying said image of said object as an object image, on the screen of a monitor;
   producing a simulating graphic form corresponding to said object on three-dimensional coordinates on the basis of data on the known shape and dimension of said object;
   specifying certain positions of said object image on said monitor to which a plurality of particular positions of said simulating graphic form produced in said simulating graphic form producing step should correspond;
   varying the attitude of said simulating graphic form on the basis of data on those positions of said object image specified in said position specifying step in such a manner that said simulating graphic form produced on the basis of said data on the known shape and dimension of said object becomes substantially coincident with said object image on said monitor;
   specifying the position on said object image of a plurality of points forming a particular measurement portion of said object on said monitor so that, on the basis of data on the specified position of said plurality of points, the position of a plurality of corresponding points of said simulating graphic form is determined; and
   measuring a quantity defined by said plurality of points on the basis of data on that position on said simulating graphic form corresponding to the position of said plurality of points specified in said position determining step.

2. A method for measuring an object by employing an imaging means, comprising:
   obtaining an image of an object whose overall shape and dimension are already known by means of an imaging means, and displaying said image of said object, as an object image, on the screen of a monitor;
   producing a simulating graphic form corresponding to said object on three-dimensional coordinates on the basis of data on the known shape and dimension of said object, and displaying said simulating graphic form on the screen of said monitor;
   specifying certain positions of said object image on said monitor to which a plurality of particular positions of said simulating graphic form produced in said simulating graphic form displaying step should correspond;
   varying the attitude of said simulating graphic form on the basis of data on those positions of said object image specified in said position specifying step in such a manner that said simulating graphic form produced on the basis of said data on the known shape and dimension of said object represents, on the monitor screen, a substantially identical aspect of said object with that reproduced as said object image;
   specifying the position on said object image of a plurality of points forming a particular measurement portion of said object on said monitor so that, on the basis of data on the specified position of said plurality of points, the position of a plurality of corresponding points of said simulating graphic form is determined; and
   measuring a quantity defined by said plurality of points on the basis of data on that position on said simulating graphic form corresponding to the position of said plurality of points specified in said position determining step.

3. A method for measuring an object by employing an imaging means, comprising:
   obtaining an image of an object whose overall shape and dimension are already known by means of an imagining means, and displaying said image of said object as an object image, on the screen of a monitor; producing a simulating graphic form corresponding to said object on three-dimensional coordinates on the basis of data on the known shape and dimension of said object;
   specifying certain positions of said object image on said monitor to which a plurality of particular positions of said simulating graphic form produced in said graphic form producing step should correspond;
   varying the attitude of said simulating graphic form on the basis of data on those positions of said object image specified in said position specifying step in such a manner that said simulating graphic form produced on the basis of said data on the known shape and dimension of said object represents, on the monitor screen, a substantially identical aspect of said object with that reproduced as said object image;
   graduating said simulating graphic form displayed on the monitor screen; and
   reading a quantity which is the subject of measurement and which is included in said object image in accordance with graduations displayed together with said simulating graphic form, said simulating graphic form being displayed while being substantially superimposed on said object image on said monitor as a result of said graphic form attitude varying process.

4. A method as in any of claims 1 to 3, wherein data on said image of said object obtained by said imaging means is stored in an image memory, then read therefrom, and outputted via a composition device to said monitor.

5. A method as in any of claims 1 to 3, wherein said simulating graphic form corresponding to said object is produced on the basis of data defining the known shape and dimension of said object, said data being read from a recording medium by a reproduction device.

6. A method as in any of claims 1 to 3, wherein said position specifying step comprises specifying four points of said object image displayed on the monitor screen, said four points consisting of two nodes of said object image and two points arbitrarily selected from among those on two straight lines respectively including said two nodes.

7. A method as in any of claims 1 to 3, wherein said graphic form attitude varying process comprises the steps of: connecting said four points specified in said position specifying process with the station point of said three-dimensional coordinates on which said simulating graphic form is produced by four straight lines originating from said station point; calculating the sum of two squares each being the square of the minimum spatial distance from one of said two straight lines including one of said two nodes and the associated point specified on the straight line to the straight line connecting said associated point with said station point; and varying the position of said nodes in such a manner that the sum of said two squares assumes its minimum value, while rotating said simulating graphic form produced on said three-dimensional coordinates about a straight line connecting said two nodes with each other.

8. A method according to claim 1 or claim 2, wherein a length is said quantity measured in said measuring process.

9. A method according to claim 1 or claim 2, wherein an area is said quantity measured in said measuring process.

10. A method according to claim 3, said graduation displaying step comprises displaying graduations simultaneously with the displaying of said simulating graphic form on the monitor screen.

11. A method according to claim 3, wherein said graduation displaying step is adapted to display graduations after said simulating graphic form has become coincident with said object image.

12. A method as in any of claims 1 to 3, wherein said imaging means for obtaining said image of said object is provided in said endoscope.

13. A method as in any of claims 1 to 3, wherein said imaging means for obtaining said image of said object is a TV camera removably mounted on the outer side of the eyepiece section of said endoscope.

14. A method as in any of claims 1 to 3, wherein said graphic form attitude varying process uses data on those positions of said object image specified in said position specifying step, and adjusts one or more parameters in such a manner that said simulating graphic form becomes substantially coincident with said object image on said monitor.

15. A method as in any of claims 1 to 3, wherein the results of the measurement are displayed on the monitor screen.

16. An apparatus for measuring an object by employing an imaging means, the apparatus being adapted to measure an object whose overall shape and dimension are already known, said apparatus comprising:

a monitor for displaying, on its screen, an image of an object obtained by imaging means;

simulating graphic form producing means for producing, on the basis of data on the known shape and dimension of said object, a simulating graphic form corresponding to said object;

position specifying means for specifying certain positions of said image of said object to which a plurality of particular positions of said simulating graphic form should correspond; and calculating means for causing the attitude of said simulating graphic form to be varied on the basis of those positions of said image specified by said position specifying means in such a manner that said simulating graphic form becomes substantially coincident with said image of said object, for causing, after the attitude of said simulating graphic form has been determined, a plurality of points forming a particular examination portion of said object to have their position on said image of said object specified, for causing, on the basis of data on the position of said plurality of points, the position of a plurality of corresponding points of said simulating graphic form to be determined, and for causing a quantity which is to be measured and which is defined by said plurality of points to be calculated.

17. A method for measuring an object by employing an imaging means, including:

obtaining an image of an object whose overall shape and dimension are already known by means of an imaging means, and displaying said image of said object as an object image, on the screen of a monitor;

producing a simulating graphic form corresponding to said object on three-dimensional coordinates on the basis of data on the known shape and dimension of said object;

specifying certain positions of said object image on said monitor to which a plurality of particular positions of said simulating graphic form produced in said graphic form producing step should correspond; and varying the attitude of said simulating graphic form on the basis of data on those positions of said object image specified in said position specifying step in such a manner that said simulating graphic form produced on the basis of said data on the known shape and dimension of said object become substantially coincident with said object image on said monitor.

* * * * *